US010999580B2

(12) United States Patent
Lim et al.

(10) Patent No.: US 10,999,580 B2
(45) **Date of Patent: *May 4, 2021**

(54) METHOD AND DEVICE FOR ENTROPY CODING/DECODING

(71) Applicant: LG Electronics Inc., Seoul (KR)

(72) Inventors: Jaehyun Lim, Seoul (KR); Byeongmoon Jeon, Seoul (KR); Yongjoon Jeon, Seoul (KR); Seungwook Park, Seoul (KR); Jungsun Kim, Seoul (KR); Joonyoung Park, Seoul (KR); Hendry Hendry, Seoul (KR); Naeri Park, Seoul (KR); Chulkeun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/998,951

(22) Filed: Aug. 20, 2020

(65) Prior Publication Data

US 2020/0382789 A1 Dec. 3, 2020

Related U.S. Application Data

(63) Continuation of application No. 16/694,279, filed on Nov. 25, 2019, now Pat. No. 10,791,329, which is a (Continued)

(51) Int. Cl.
*H04N 19/122* (2014.01)
*H04N 19/136* (2014.01)
(Continued)

(52) U.S. Cl.
CPC ......... *H04N 19/136* (2014.11); *H04N 19/174* (2014.11); *H04N 19/44* (2014.11);
(Continued)

(58) Field of Classification Search
CPC .... H04N 19/136; H04N 19/174; H04N 19/44; H04N 19/91; H04N 19/96; H04N 19/50; H04N 19/176; H04N 19/13
See application file for complete search history.

(56) References Cited

U.S. PATENT DOCUMENTS 7,630,440 B2 12/2009 Prakasam
7,777,654 B2 8/2010 Chang
(Continued)

FOREIGN PATENT DOCUMENTS

EP 2 051 383 A2 4/2009
KR 10-0667816 B1 1/2007
(Continued)

OTHER PUBLICATIONS

International Search Report dated Apr. 22, 2014 for Application No. PCT /KR2013/000276, with English Translation, 4 pages.

*Primary Examiner* — Howard D Brown, Jr.
(74) *Attorney, Agent, or Firm* — Dentons US LLP

(57) ABSTRACT

The present invention relates to an entropy decoding method which includes: generating context related to a bin that forms a codeword of a syntax element; and performing arithmetic decoding of the bin based on the context.

20 Claims, 7 Drawing Sheets

Related U.S. Application Data continuation of application No. 16/244,848, filed on Jan. 10, 2019, now Pat. No. 10,531,092, which is a continuation of application No. 15/643,092, filed on Jul. 6, 2017, now Pat. No. 10,225,557, which is a continuation of application No. 14/373,190, filed as application No. PCT/KR2013/000276 on Jan. 14, 2013, now Pat. No. 9,729,884.

(60) Provisional application No. 61/587,661, filed on Jan. 18, 2012.

(51) Int. Cl.

| | |
|---|---|
| ***H04N 19/50*** | (2014.01) |
| ***H04N 19/96*** | (2014.01) |
| ***H04N 19/91*** | (2014.01) |
| ***H04N 19/44*** | (2014.01) |
| ***H04N 19/174*** | (2014.01) |
| *H04N 19/176* | (2014.01) |
| *H04N 19/13* | (2014.01) |

(52) U.S. Cl.

CPC ............. *H04N 19/50* (2014.11); *H04N 19/91* (2014.11); *H04N 19/96* (2014.11); *H04N 19/13* (2014.11); *H04N 19/176* (2014.11)

(56) References Cited

U.S. PATENT DOCUMENTS

| | | | | |
|---|---|---|---|---|
| 9,838,034 | B2 | 12/2017 | Chuang et al. | |
| 10,110,891 | B2 | 10/2018 | Yamamoto et al. | |
| 2006/0209965 | A1 | 9/2006 | Tseng | |
| 2007/0086521 | A1 | 4/2007 | Wang | |
| 2007/0183491 | A1 | 8/2007 | Pearson | |
| 2009/0096643 | A1 | 4/2009 | Chang | |
| 2009/0110073 | A1 | 4/2009 | Wu | |
| 2013/0027230 | A1 | 1/2013 | Marpe | |
| 2013/0272380 | A1 | 10/2013 | Chien | |
| 2013/0329784 | A1 | 12/2013 | Chuang et al. | |
| 2014/0092978 | A1 | 4/2014 | Bugdayci et al. | |
| 2014/0192861 | A1 | 7/2014 | Chuang et al. | |
| 2015/0249828 | A1* | 9/2015 | Rosewarne ............ | H04N 19/60<br>375/240.02 |
| 2017/0324960 | A1* | 11/2017 | Lim ....................... | H04N 19/50 |
| 2018/0167615 | A1 | 6/2018 | Kim et al. | |
| 2018/0288446 | A1 | 10/2018 | An et al. | |
| 2019/0052878 | A1 | 2/2019 | Zhao et al. | |

FOREIGN PATENT DOCUMENTS

| | | | |
|---|---|---|---|
| KR | 10-0667816 | | 5/2007 |
| KR | 10-2009-0038808 | | 4/2009 |
| KR | 10-0955418 | B1 | 5/2010 |
| KR | 10-2011-0021325 | A | 3/2011 |
| KR | 10-2011-0021325 | | 4/2011 |
| KR | 10-2011-0079404 | | 7/2011 |
| KR | 10-2011-0079404 | A | 7/2011 |
| KR | 10-2011-0110855 | A | 10/2011 |
| WO | 2010/090629 | | 8/2010 |
| WO | WO 2010/090629 | A1 | 8/2010 |

* cited by examiner

METHOD AND DEVICE FOR ENTROPY CODING/DECODING

This application is a continuation of U.S. patent application Ser. No. 16/694,279, filed on Nov. 25, 2019, which is a continuation of U.S. patent application Ser. No. 16/244,848, filed on Jan. 10, 2019, now U.S. Pat. No. 10,531,092, which is a continuation of U.S. patent application Ser. No. 15/643,092, filed on Jul. 6, 2017, now U.S. Pat. No. 10,225,557, which is a continuation of U.S. patent application Ser. No. 14/373,190, filed on Jul. 18, 2014, now U.S. Pat. No. 9,729,884, which is a National Stage Entry of International Application No. PCT/KR2013/000276, filed on Jan. 14, 2013, and claims the benefit of and priority to U.S. Provisional Application No. 61/587,661, filed on Jan. 18, 2012, all of which are hereby incorporated by reference in their entirety for all purposes as if fully set forth herein.

TECHNICAL FIELD

The present invention relates to A video processing technique, and more particularly, to an entropy encoding/decoding method and a device using the same.

BACKGROUND ART

Recently, demands for a high-resolution and high-quality video such as a high definition (HD) video and an ultra high definition (UHD) video have increased in various fields of applications. As a video has higher resolution and higher quality, an amount of information or an amount of bits to be transmitted increases more and more relatively to existing videos. Accordingly, when video information is transferred using media such as existing wired or wireless broadband lines or video information is stored in existing storage media, the information transfer cost and the information storage cost increase. High-efficiency video compressing techniques can be used to solve these problems.

Various techniques such as an inter prediction technique of predicting pixel values of a current picture with reference to pictures previous and/or subsequent to the current picture, an intra prediction technique of predicting pixel values of a current picture using pixel information in the current picture, and an entropy coding technique of allocating a short code to a value of a low appearance frequency and allocating a long code of a value of a high appearance frequency are known as the video compressing techniques. It is possible to effectively compress, transfer, or store video data using such video compressing techniques.

SUMMARY OF THE INVENTION

Technical Problem

An object of the invention is to provide video encoding method and device that can enhance video encoding/decoding efficiency and reduce complexity.

Another object of the invention is to provide a video decoding method and a video decoder which can improve video encoding/decoding efficiency and reduce complexity.

Still another object of the invention is to provide entropy encoding method and device which can improve video encoding/decoding efficiency and reduce complexity.

Still another object of the invention is to provide entropy decoding method and device which can improve video encoding/decoding efficiency and reduce complexity.

Solution to Problem

According to an aspect of the invention, there is provided an entropy decoding method. The entropy decoding method including the steps of: deriving a context for a bin constituting a codeword of a syntax element; and performing an arithmetic decoding operation on the bin on the basis of the derived context. Here, the step of deriving the context may include deriving the context on the basis of at least one of information on a size of a transform block to which the syntax element is applied and information on a partition depth of the transform block.

The context may be indicated by the sum of a context index offset determined on the basis of a slice type of a current slice and a context index by the bin.

The syntax element may be a luma coded block flag indicating whether luma components of the transform block include one or more coefficients other than 0, the bin may be a first bin of the codeword to which a bin index value of 0 is allocated, and the context index may be derived on the basis of a context table to which the context index by the bin is allocated.

When the partition depth of the transform block is 0, a context index of 1 may be allocated to the bin.

When the partition depth of the transform block is not 0, a context index of 1 may be allocated to the bin when the size of the transform block is equal to a maximum transform size of a current sequence, and a context index of 0 may be allocated to the bin when the size of the transform block is not equal to the maximum transform size.

The context index allocated to the bin may be determined depending on the partition depth of the transform block without depending on the size of the transform block.

When the partition depth of the transform block is not 0, a context index of 0 may be allocated to the bin without depending on whether the size of the transform block is equal to the maximum transform size of the current sequence.

The value of the context index offset may be 0 when the current slice is an I slice, may be 2 when the current slice is a P slice, and may be 4 when the current slice is a B slice.

The syntax element may be a chroma coded block flag indicating whether chroma components of the transform block include one or more coefficients other than 0, the bin may be a first bin of the codeword to which a bin index value of 0 is allocated, and the context index may be derived on the basis of a context table to which the context index by the bin is allocated.

The value of the partition depth of the transform block may be allocated as the context index by the bin.

The value of the context index offset may be 0 when the current slice is an I slice, may be 2 when the current slice is a P slice, and may be 4 when the current slice is a B slice.

According to another aspect of the invention, there is provided a video decoding method. The video decoding method includes the steps of: deriving a context for a bin constituting a codeword of a syntax element; acquiring information on the syntax element by performing an arithmetic decoding operation on the bin on the basis of the derived context; and reconstructing a video on the basis of the information on the syntax element. Here, the step of deriving the context may include deriving the context on the basis of at least one of information on a size of a transform block to which the syntax element is applied and information on a partition depth of the transform block.

According to still another aspect of the invention, there is provided a video decoder. The video decoder includes: an entropy decoding module that derives a context for a bin constituting a codeword of a syntax element that acquires information on the syntax element by performing an arithmetic decoding operation on the bin on the basis of the derived context; and a video reconstructing module that reconstructs a video on the basis of the information on the syntax element. Here, the entropy decoding module may derive the context on the basis of at least one of information on a size of a transform block to which the syntax element is applied and information on a partition depth of the transform block.

The context may be indicated by the sum of a context index offset determined on the basis of a slice type of a current slice and a context index by the bin.

The syntax element may be a luma coded block flag indicating whether luma components of the transform block include one or more coefficients other than 0, the bin may be a first bin of the codeword to which a bin index value of 0 is allocated, and the entropy decoding module may determine the context index on the basis of a context table to which the context index by the bin is allocated.

The entropy decoding module may allocate a context index of 1 to the bin when the partition depth of the transform block is 0.

The entropy decoding module may allocate a context index of 1 to the bin when the partition depth of the transform block is not 0 and the size of the transform block is equal to a maximum transform size of a current sequence, and the entropy decoding module may allocate a context index of 0 to the bin when the size of the transform block is not equal to the maximum transform size.

The entropy decoding module may determine the context index allocated to the bin depending on the partition depth of the transform block without depending on the size of the transform block.

The entropy decoding module may allocate a context index of 0 to the bin, without depending on whether the size of the transform block is equal to the maximum transform size of the current sequence, when the partition depth of the transform block is not 0.

The value of the context index offset may be 0 when the current slice is an I slice, may be 2 when the current slice is a P slice, and may be 4 when the current slice is a B slice.

Advantageous Effects

According to the video encoding method of the invention, it is possible to enhance video encoding/decoding efficiency and to reduce complexity.

According to the video decoding method of the invention, it is possible to enhance video encoding/decoding efficiency and to reduce complexity.

According to the entropy encoding method of the invention, it is possible to enhance video encoding/decoding efficiency and to reduce complexity.

According to the entropy decoding method of the invention, it is possible to enhance video encoding/decoding efficiency and to reduce complexity.

DESCRIPTION OF EXEMPLARY EMBODIMENTS

Figure 1:
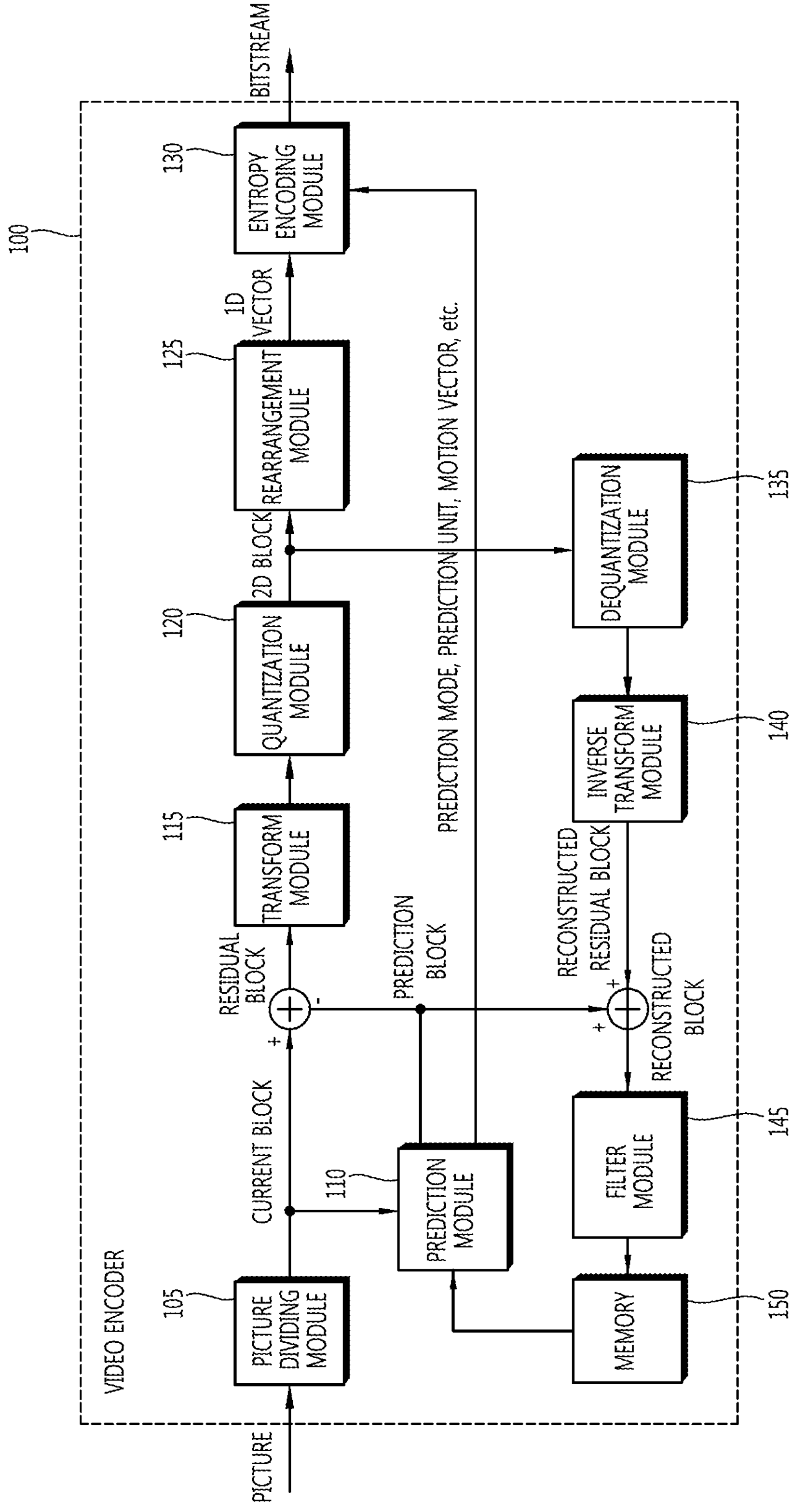
FIG. 1 is a block diagram schematically illustrating a video encoder according to an embodiment of the invention.

The present invention may be variously modified in various forms and may have various embodiments, and specific embodiments thereof will be illustrated in the drawings and described in detail. However, these embodiments are not intended for limiting the invention. Terms used in the below description are used to merely describe specific embodiments, but are not intended for limiting the technical spirit of the invention. An expression of a singular number includes an expression of a plural number, so long as it is clearly read differently. Terms such as “include” and “have” in this description are intended for indicating that features, numbers, steps, operations, elements, components, or combinations thereof used in the below description exist, and it should be thus understood that the possibility of existence or addition of one or more different features, numbers, steps, operations, elements, components, or combinations thereof is not excluded.

On the other hand, elements of the drawings described in the invention are independently drawn for the purpose of convenience of explanation on different specific functions in an image encoder and an image decoder, and do not mean that the elements are embodied by independent hardware or independent software. For example, two or more elements out of the elements may be combined to form a single element, or one element may be partition into plural elements. Embodiments in which the elements are combined and/or partition belong to the scope of the invention without departing from the concept of the invention.

Hereinafter, exemplary embodiments of the invention will be described in detail with reference to the accompanying drawings. The same elements in the drawings will be referenced by the same reference signs and the description of the same elements will not be repeated.

FIG. 1 is a block diagram schematically illustrating a video encoder according to an embodiment of the invention. Referring to FIG. 1, a video encoder 100 includes a picture partitioning module 105, a prediction module 110, a transform module 115, a quantization module 120, a rearrangement module 125, an entropy encoding module 130, a dequantization module 135, an inverse transform module 140, a filter module 145, and a memory 150.

The picture partitioning module 105 may partition an input picture into at least one process unit block. Here, a block as the process unit may be a prediction unit (hereinafter, referred to as a “PU”), a transform unit (hereinafter, referred to as a “TU”), or a coding unit (hereinafter, referred to as a “CU”).

The prediction module 110 includes an inter prediction module that performs an inter prediction operation and an intra prediction module that performs an intra prediction operation. In order to enhance encoding efficiency, the video encoder may predict a picture using a previously-encoded region and may encode residual values between an original picture and the predicted picture.

The prediction module 110 may perform a prediction operation on the process unit of a picture partition by the picture partitioning module 105 to construct a predicted block. The process unit of a picture in the prediction module 110 may be a CU, a TU, or a PU. The prediction module 110 may determine whether the prediction operation performed on the corresponding process unit is an inter prediction operation or an intra prediction operation, and may determine specific details (for example, a prediction mode) of the prediction methods may be determined. The process unit subjected to the prediction operation may be different from the process unit of which the prediction method and the specific details are determined. For example, the prediction method and the prediction mode may be determined in the units of CU or PU and the prediction operation may be performed in the units of TU.

In the inter prediction, a prediction operation may be performed on the basis of information on at least one of a previous picture and/or a subsequent picture of a current picture to construct a predicted block. In the intra prediction, a prediction operation may be performed on the basis of pixel information of a current picture to construct a predicted block.

A skip mode, a merge mode, a motion vector prediction (MVP), or the like may be used as the intra prediction method. In the inter prediction, a reference picture may be selected for a PU, and a reference block having the same size as the PU may be selected. The reference block may be selected in the unit of integer pixels. A predicted block may be constructed so that a residual signal from a current PU is minimized and the magnitude of a motion vector is minimized.

The predicted block may be constructed in the unit of integer pixel samples or in the unit of pixel samples less than an integer pixel, such as ½ pixel samples and ¼ pixel samples. Here, a motion vector may also be expressed in the unit of pixel samples less than an integer pixel. For example, luma pixels may be expressed in the unit of ¼ pixels and chroma pixels may be expressed in the unit of ⅛ pixels.

Information such as an index of a reference picture selected through the inter prediction, a motion vector (for example, a motion vector predictor), and a residual signal may be entropy-encoded and transmitted to a video decoder. When the skip mode is used, the predicted block may be used as a reconstructed block and thus the residual signal may not be created, converted, quantized, and transmitted.

When the intra prediction is performed, a prediction mode may be determined in the unit of PUs and the prediction operation may be performed in the unit of PUs. Alternatively, a prediction mode may be determined in the unit of PUs and the intra prediction may be performed in the unit of TUs.

In the intra prediction, the prediction module 110 may determine an intra prediction mode of a PU and may perform a prediction operation on the basis of the determined intra prediction mode. The prediction modes in the intra prediction may include 33 directional prediction modes and at least two non-directional modes. The non-directional modes may include a DC prediction mode and a planar mode.

In the intra prediction, a predicted block may be constructed after a filter is applied to reference samples. At this time, it may be determined whether a filter should be applied to reference samples, depending on the intra prediction mode of a current block and/or the size of the current block.

Information on the intra prediction mode selected through the intra prediction may be entropy-encoded and transmitted to the video decoder.

A PU may be a block having various sizes/shapes. For example, in case of the inter prediction, a PU may be a 2N×2N block, a 2N×N block, a N×2N block, or a N×N block (where N is an integer). In case of the intra prediction, a PU may be a 2N×2N block or a N×N block (where N is an integer). The PU having a block size of N×N may be set to be used in only a specific case. For example, the PU having a block size of N×N may be set to be used for only a CU having the smallest size or may be set to be used for only the intra prediction. In addition to the above-mentioned sizes, PUs such as a N×mN block, a mNxN block, a 2N×mN block, and a mN×2N block (where m<1) may be additionally defined and used.

Residual values (a residual block or a residual signal) between the constructed predicted block and the original block may be input to the transform module 115. The prediction mode information, the motion vector information, and the like used for the prediction may be encoded along with the residual values by the entropy encoding module 130 and may be transmitted to the video decoder.

The transform module 115 may perform a transform operation on the residual block by transform units and created transform coefficients. The transform unit in the transform module 115 may be a TU and may have a quad tree structure. The size of the transform unit may be determined within a predetermined range of largest and smallest sizes. The transform module 115 may transform the residual block using a discrete cosine transform (DCT) and/or a discrete sine transform (DST).

The quantization module 120 may quantize the residual values transformed by the transform module 115 and may create quantization coefficients. The values calculated by the quantization module 120 may be supplied to the dequantization module 135 and the rearrangement module 125.

The rearrangement module 125 may rearrange the quantization coefficients supplied from the quantization module 120. By rearranging the quantization coefficients, it is possible to enhance the coding efficiency in the entropy encoding module 130. The rearrangement module 125 may rearrange the quantization coefficients in the form of a two-dimensional block to the form of a one-dimensional vector through the use of a coefficient scanning method. The rearrangement module 125 may enhance the entropy encoding efficiency in the entropy encoding module 130 by changing the coefficient scanning order on the basis of stochastic statistics of the coefficients transmitted from the quantization module.

The entropy encoding module 130 may perform an entropy encoding operation on the quantization coefficients rearranged by the rearrangement module 125. Examples of the entropy encoding method include an exponential Golomb method, a CAVLC (Context-Adaptive Variable Length Coding) method, and a CABAC (Context-Adaptive Binary Arithmetic Coding) method. The entropy encoding module 130 may encode a variety of information such as quantization coefficient information and block type information of a CU, prediction mode information, partition unit information, PU information, transfer unit information, motion vector information, reference picture information, block interpolation information, and filtering information transmitted from the rearrangement module 125 and the prediction module 110.

The entropy encoding module 130 may give a predetermined change to a parameter set or syntaxes to be transmitted, if necessary.

The entropy encoding module 130 may create consecutive codewords on the basis of input symbols. Here, the length of a codeword may be variable. For example, when the entropy encoding is performed, a low index value and a short codeword corresponding thereto may be allocated to a symbol of a high appearance frequency and a high index value and a long codeword corresponding thereto may be allocated to a symbol of a low appearance frequency. Therefore, it is possible to reduce an amount of bits for symbols to be encoded and to improve video compression performance by the entropy encoding.

The dequantization module 135 dequantizes the values quantized by the quantization module 120. The inverse transform module 140 inversely transforms the values dequantized by the dequantization module 135. The residual values created by the dequantization module 135 and the inverse transform module 140 may be merged with the predicted block predicted by the prediction module 110 to construct a reconstructed block.

FIG. 1 illustrates that the residual block and the predicted block are added by an adder to construct a reconstructed block. Here, the adder may be considered as a particular module (reconstructed block constructing module) that constructs a reconstructed block.

The filter module 145 may apply a deblocking filter, a sample adaptive offset (SAO), and/or an adaptive loop filter (ALF) to the reconstructed picture.

The deblocking filter may remove a block distortion generated at the boundary between blocks in the reconstructed picture. The SAO may reconstruct an offset difference of the residual block, which has been subjected to the deblocking filter, from the original video in the unit of pixels and may be applied in the form of a band offset and an edge offset. The ALF may perform a filtering operation on the basis of the resultant values of comparison of the original picture with the reconstructed picture of which the blocks have been filtered by the deblocking filter and/or the SAO. The ALF may be applied only when high efficiency is necessary.

On the other hand, the filter module 145 may not perform a filtering operation on the reconstructed block used in the inter prediction.

The memory 150 may store the reconstructed block or picture calculated by the filter module 145. The reconstructed block or picture stored in the memory 150 may be supplied to the prediction module 110 that performs the inter prediction.

Figure 2:
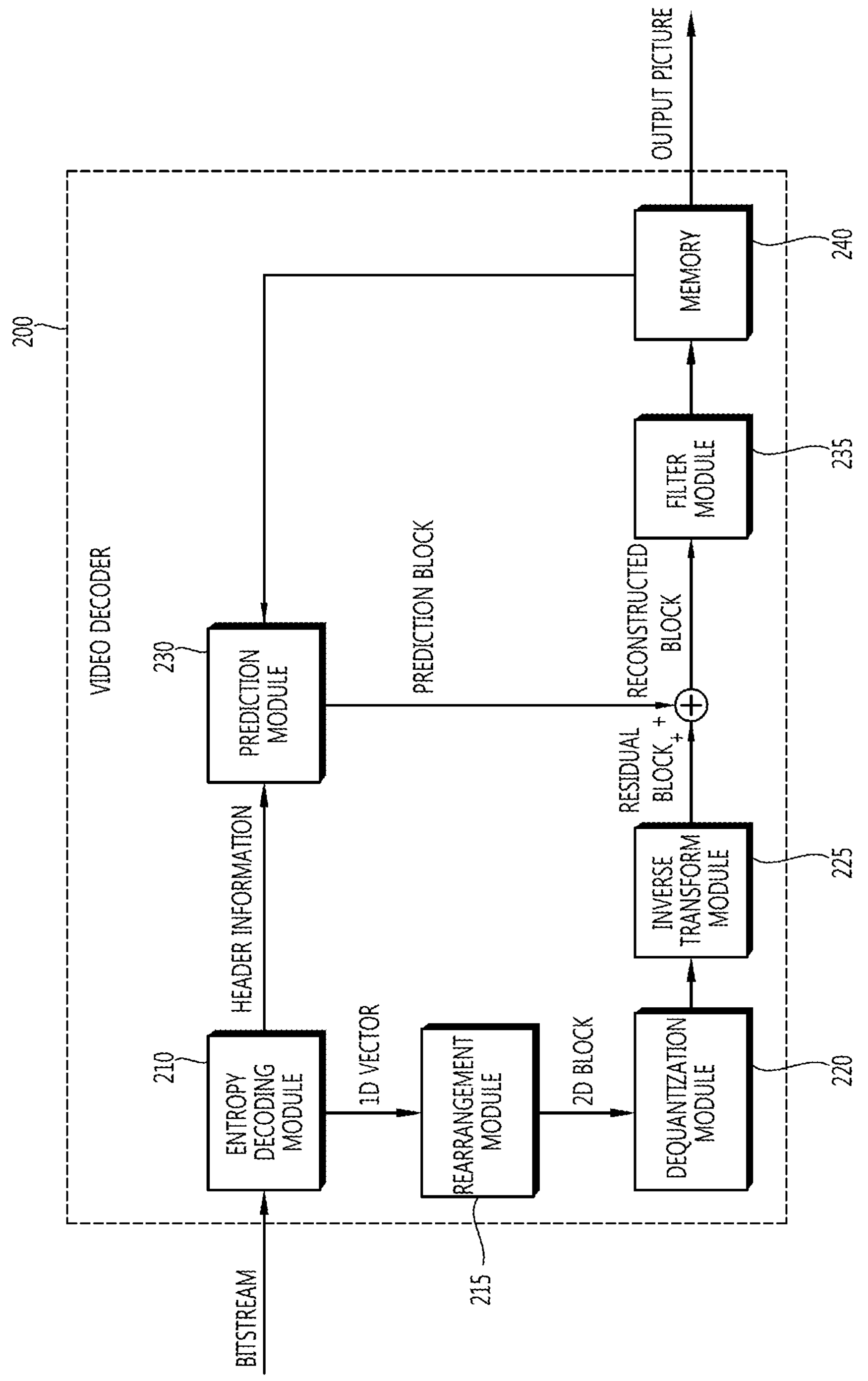
FIG. 2 is a block diagram schematically illustrating a video decoder according to an embodiment of the invention.

FIG. 2 is a block diagram schematically illustrating a video decoder according to an embodiment of the invention. Referring to FIG. 2, a video decoder 200 may include an entropy decoding module 210, a rearrangement module 215, a dequantization module 220, an inverse transform module 225, a prediction module 230, a filter module 235, and a memory 240.

When a video bitstream is input from the video encoder, the input bitstream may be decoded on the basis of the order in which video information is processed by the video encoder.

For example, when the video encoder uses a variable length coding (hereinafter, referred to as "VLC") method such as the CAVLC method to perform the entropy encoding operation, the entropy decoding module 210 may implement the same VLC table as the VLC table used in the video encoder and may perform the entropy decoding operation. When the video encoder uses the CABAC method to perform the entropy encoding process, the entropy decoding module 210 may perform the entropy decoding operation using the CABAC method to correspond thereto.

Information for constructing a predicted block out of the information decoded by the entropy decoding module 210 may be supplied to the prediction module 230, and the residual values entropy-decoded by the entropy decoding module 210 may be input to the rearrangement module 215.

The rearrangement module 215 may rearrange the bitstream entropy-decoded by the entropy decoding module 210 on the basis of the rearrangement method in the video encoder. The rearrangement module 215 may reconstruct and rearrange coefficients expressed in the form of a one-dimensional vector into coefficients in the form of a two-dimensional block. The rearrangement module 215 may be supplied with information associated with the coefficient scanning performed by the video encoder and may perform the rearrangement using a method of inversely scanning the coefficients on the basis of the scanning order in which the scanning is performed by the video encoder.

The dequantization module 220 may perform dequantization on the basis of the quantization parameters supplied from the video encoder and the coefficient values of the rearranged block.

The inverse transform module 225 may perform the inverse DCT and/or inverse DST of the DCT and/or DST, which has been performed by the transform module of the video encoder, on the quantization result from the video encoder. The inverse transform may be performed on the basis of a transfer unit or a partition unit of a picture determined by the video encoder. The transform module of the video encoder may selectively perform the DCT and/or DST depending on plural information pieces such as the prediction method, the size of a current block, and the prediction direction, and the inverse transform module 225 of the video decoder may perform the inverse transform on the basis of the transform information on the transform performed by the transform module of the video encoder.

The prediction module 230 may construct a predicted block on the basis of prediction block construction information supplied from the entropy decoding module 210 and the previously-decoded block and/or picture information supplied from the memory 240. The specific prediction method performed by the prediction module 230 may be the same as the prediction method performed by the prediction module of the video encoder.

When the prediction mode of a current CU and/or PU is an intra prediction mode, the prediction module 230 may perform an intra prediction operation of constructing a predicted block on the basis of pixel information of a current picture. At this time, the prediction module 230 may determine an intra prediction mode of the PU and may perform the prediction operation on the basis of the determined intra prediction mode. Here, when intra prediction mode-relevant information received from the video encoder is confirmed, the intra prediction mode may be induced to correspond to the intra prediction mode-relevant information.

When the prediction mode for a current CU and/or PU is the inter prediction mode, the prediction module 230 may perform the inter prediction operation on the current PU on the basis of information included in at least one of a previous picture and a subsequent picture of the current picture. At this time, motion information for the inter prediction of the current PU, for example, information on motion vectors and reference picture indices, supplied from the video encoder may be induced from a skip flag, a merge flag, and the like received from the video encoder.

The reconstructed block may be constructed using the predicted block constructed by the prediction module 230 and the residual block supplied from the inverse transform module 225. FIG. 2 illustrates that the residual block and the predicted block are added by an adder to construct a reconstructed block. Here, the adder may be considered as a particular module (reconstructed block constructing module) that constructs a reconstructed block.

When the skip mode is used, the residual signal may not be transmitted and the predicted block may be used as a reconstructed block.

The reconstructed block and/or picture may be supplied to the filter module 235. The filter module 235 may perform a deblocking filtering operation, an SAO operation, and/or an ALF operation on the reconstructed block and/or picture.

The memory 240 may store the reconstructed picture or block for use as a reference picture or a reference block and may supply the reconstructed picture to an output module.

Although not illustrated herein for the purpose of convenience of explanation, a bitstream input to the video decoder may be input to the entropy decoding module 210 after being subjected to a parsing process. The entropy decoding module 210 may perform the parsing process.

On the other hand, in FIG. 2, the rearrangement module 215, the dequantization module 220, the inverse transform module 225, the prediction module 230, the filter module 235, and the memory 240 are illustrated as individual modules, but these modules may be incorporated into a single module. For example, the rearrangement module 215, the dequantization module 220, the inverse transform module 225, the prediction module 230, the filter module 235, and the memory 240 may be considered as a single "video decoding module". Here, the video decoding module may reconstruct a video through the above-mentioned processes on the basis of the information decoded by the entropy decoding module 210.

A video signal processed by the video encoder and the video decoder may include three color signals representing magnitudes of three primary color components. The three color signals may be indicated by R (Red), G (Green), and B (Blue). In order to reduce the frequency bands used for the video processing, the R, G, and B signals may be converted into luma and chroma signals which are equivalent to the R, G, and B signals. Here, a video signal may include one luma signal and two chroma signals. The luma signal is a component representing the brightness of a screen and the chroma signal is a component representing the color of the screen. For example, the chroma signal may represent a difference between predetermined colors. The luma signal may be indicated by "L" or "luma" and the two chroma signals may be indicated by "Cb" and "Cr". Since the human eye is sensitive to the luma signal and is insensitive to the chroma signals, the number of pixels of the chroma component in a picture or a block may be smaller than the number of pixels of the luma component.

In the invention, "coding" may be analyzed to be encoding and/or decoding depending on circumstances. "Information" may be understood as a term including all of values, parameters, coefficients, and elements.

"Screen" or "picture" generally means a unit representing an image of a specific time zone. "Slice" and "frame" may mean a unit constituting a part of a picture in actual video coding. The terms, "slice" and "frame", may be mixed with each other case by case.

In the below description, a current block may be a block which is currently subjected to encoding, decoding, and/or prediction operations and may be a block corresponding to a process unit when the encoding, decoding, and/or prediction operations are performed. For example, when a prediction operation is performed on a current block, the current block may be a prediction target block corresponding to a current prediction unit. In the below description, a block constructed through the prediction is referred to as a predicted block.

A "unit" means a basic unit for processing a picture or a specific position in a picture, such as a coding unit (CU), a prediction unit (PU), and a transform unit (TU) and may be distinguished from a "block" indicating a set of pixels and/or samples. In the below description, for the purpose of convenience of explanation, a "unit" may mean a "block" corresponding to the "unit". For example, in the below description, a prediction target block corresponding to one prediction unit may be referred to as a prediction unit and/or a prediction block, an encoding/decoding target block corresponding to one coding unit may be referred to as a coding unit and/or a coding block. A block may be used as a term expressing a set of pixels or transform coefficients including M (where M is a natural number) columns and N (where N is a natural number) rows. This distinction will be apparent to those skilled in the art.

On the other hand, slices used in the video encoding process and the video decoding process in FIGS. 1 and 2 may be classified into an I slice, a P slice, and a B slice. The I slice is a slice which is encoded/decoded in only the intra prediction. Temporal prediction is not applied to the I slice and only intra information can be used for the prediction process. The P slice is a slice which can be encoded/decoded through the inter prediction or the intra prediction using at least one motion vector and a reference picture index to predict pixel values of blocks. The B slice is a slice which can be encoded/decoded through the inter prediction or the intra prediction using at least two motion vectors and reference picture indices to predict pixel values of blocks.

In an inter prediction mode, the video encoder illustrated in FIG. 1 or the video decoder illustrated in FIG. 2 may derive motion information of a current block and may perform the inter prediction on the current block on the basis of the derived motion information.

A picture used to predict a current block may be referred to as a reference picture or a reference frame. An area in a reference picture may be expressed by a reference picture index indicating the reference picture and a motor vector.

A reference picture list for a current picture and/or a current slice may be constructed by pictures used for prediction, and a reference picture index indicates a specific reference picture in the reference picture list. The P slice requires a single reference picture list such as reference picture list 0, and the B slice requires two reference picture lists such as reference picture list 0 and reference picture list 1.

For example, a P slice can be encoded/decoded by unidirectional prediction using one reference picture. Here, a P slice requires one reference picture list, which is called reference picture list 0 (L0).

A B slice can be encoded/decoded by forward, backward, or bi-directional prediction, for example, using two reference pictures. The B slice requires two reference picture lists, which are called reference picture list 0 (L0) and reference picture list 1 (L1).

The inter prediction using a reference picture selected from L0 is called L0 prediction. The L0 prediction is used mainly for forward prediction. The inter prediction using a reference picture selected from L1 is called L1 prediction. The L1 prediction is used mainly for backward prediction. The L0 prediction and the L1 prediction are respectively called uni-prediction. The inter prediction using two reference pictures selected from L0 and L1 is called bi-prediction.

The inter prediction mode applied to a current block (for example, PU) out of the L0 prediction, the L1 prediction, and the bi-prediction may be indicated by a syntax element of "inter_pred_idc" in a system. Here, inter_pred_idc may indicate the inter prediction direction of the current block. When the prediction mode of the current block is an inter mode, information on to which inter prediction mode out of the L0 prediction, the L1 prediction, and the bi-prediction the prediction mode of the current block corresponds may be transmitted from the video encoder to the video decoder through the use of inter_pred_idc.

When the inter prediction modes are reduced to two types of the bi-prediction mode and the uni-prediction mode, the index of "inter_pred_idc" may be replaced with a flag such as "inter_pred_flag". In this case, LC prediction collectively expressing the L0 prediction and the L1 prediction may be used. The LC prediction means inter prediction using a reference picture selected from a combined list of reference picture list 0 and reference picture list 1. Here, inter_pred_flag may indicate one of the LC prediction and the bi-prediction.

Figure 3:
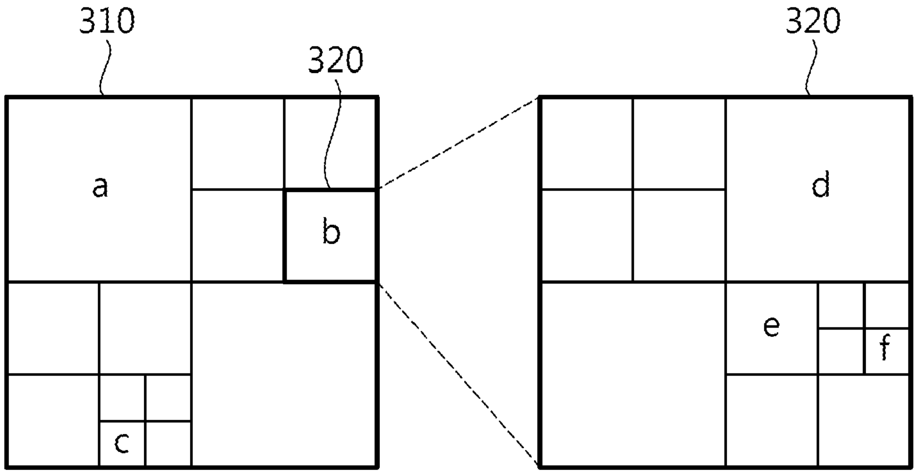
FIG. 3 is a diagram schematically illustrating an example of a quad tree structure of process units in a system to which the invention is applied.

FIG. 3 is a diagram schematically illustrating an example of a quad tree structure of process units in a system to which the present invention is applied.

A coding unit (CU) may mean a unit of a picture subjected to encoding/decoding. One coding block in a coding target picture may have a depth based on a quad tree structure and may be repeatedly partitioned. A coding block which is not partitioned any more may be the coding unit, and the video encoder may perform an encoding operation on the coding unit.

Here, a coding block repeatedly partitioned on the basis of a quad tree structure may be referred to as a coding tree block (CTB). One coding tree block may not be additionally partitioned. In this case, the coding tree block itself may be one coding unit. Therefore, the coding tree block may correspond to a largest coding unit (LCU) which is a coding unit having the largest size. On the other hand, a coding unit having the smallest size in the coding tree block may be referred to as a smallest coding unit (SCU).

In FIG. 3, reference numeral 310 denotes a coding tree block. The coding tree block 310 may have a hierarchical structure including smaller coding units (for example, a, b, and c) by partitioning. The hierarchical structure of the coding tree block 310 may be specified on the basis of size information, depth information, partition flag information, and the like.

For example, the coding unit a may correspond to a block obtained by partitioning the coding tree block 310 one time and the partition depth of the coding unit a may be 1. The coding unit b may correspond to a block obtained by partitioning the coding tree block 310 two times and the partition depth of the coding unit b may be 2. The coding unit c may correspond to a block obtained by partitioning the coding tree block 310 three times and the partition depth of the coding unit c may be 3. When the coding tree block is used as a coding unit without being partitioned, the partition depth of the coding unit may be 0. The partition depth of the coding unit may be indicated, for example, by "cuDepth" or "ctDepth".

The size information, the partition flag information, and the like indicating the hierarchical structure of the coding tree block 310 may be transmitted from the video encoder to the video decoder in a state where they are included in a sequence parameter set (SPS), a slice segment header, and/or a coding quad-tree syntax.

One coding unit may be partitioned into plural transform units (TUs) on the basis of the quad-tree structure. Similarly to the process of partitioning a coding tree block, a coding unit may be repeatedly partitioned with a depth on the basis of the quad-tree structure. Here, a block which cannot be partitioned any more may correspond to a transform unit (TU). A coding unit which cannot be partitioned any more may correspond to a transform unit.

In FIG. 3, reference numeral 320 denotes a coding unit (coding unit b). Referring to FIG. 3, the coding unit 320 may have a hierarchical structure including smaller transform units (for example, d, e, and f) by partitioning. Here, the hierarchical structure may be called "transform tree" to correspond to a coding tree. The hierarchical structure of the transform tree may be indicated by a transform tree syntax (for example, transform_tree( ), and may be specified on the basis of the size information, the depth information, the partition flag information, and the like thereof.

For example, the transform unit d may correspond to a block obtained by partitioning the coding unit 320 one time and the partition depth of the transform unit d may be 1. The transform unit e may correspond to a block obtained by partitioning the coding tree block 320 two times and the partition depth of the transform unit e may be 2. The transform unit f may correspond to a block obtained by partitioning the coding tree block 320 three times and the partition depth of the transform unit f may be 3. When the coding unit is used as a transform unit without being partitioned, the partition depth of the transform unit may be 0. The partition depth of the transform unit may be indicated, for example, by a parameter "traDepth".

The size of a transform unit may be indicated, for example, by a parameter "log2TrafoSize". Here, the actual size of the transform unit may correspond to $2^{log2TrafoSize}$ or 1<<log2TrafoSize.

The partition flag information may be included in a transform tree syntax and may be transmitted from the video encoder to the video decoder in this state. Here, the partition flag information may indicate whether each block is partitioned into four blocks in the course of partitioning the transform tree structure.

Information (for example, log2_min_transform_block_size_minus2) on the smallest transform size (the size of the smallest transform unit or the size of the smallest transform block) allowable in a sequence may be included in an SPS and may be transmitted from the video encoder to the video decoder in this state. Information (for example, log2_diff_max_min_transform_block_size) on the difference between the largest transform size (the size of the large transform unit or the size of the largest transform block) and the smallest transform size may also be transmitted from the video encoder to the video decoder through the use of the SPS. The video decoder may derive the largest transform size allowable in the sequence on the basis of the information on the smallest transform size and the information on the difference between the largest transform size and the smallest transform size. For example, the largest transform size may be indicated by a parameter "Log 2MaxTrafoSize". Here, the actual largest transform size may correspond to $2^{Log\ 2MaxTrafoSize}$ or 1<<Log 2MaxTrafoSize.

On the other hand, the transform tree syntax may be defined in a coding unit syntax. However, when a residual signal or residual information of a coding unit is not present, information of the coding unit may be expressed by only information on the prediction without using the information on the transform tree.

Flag information on whether a residual signal and/or residual information of a current coding unit is present may be included in a coding unit syntax and may be transmitted from the video encoder to the video decoder in this state. At this time, the flag information may correspond to a flag indicating whether a transform tree syntax of the current coding unit is present. The flag may be indicated, for example, by a syntax element of "no_residual_data_flag" or "no_residual_syntax_flag".

The information transmitted from the video encoder to the video decoder may include coded block flag (CBF) information. For example, the coded block flag information may be defined in the transform tree syntax.

The coded block flag information may indicate whether respective transform blocks of a luma component (Y) and chroma components Cb and Cr include a transform coefficient other than 0. For example, the coded block flag for a luma component may indicate whether a luma component transform block includes one or more transform coefficients other than 0. For example, the coded block flag for a luma component may be indicated by a syntax element "cbf_luma". That is, "cbf_luma" may indicate when residual information is present for the luma components of a transform block. The coded block flag for a chroma component may indicate whether a chroma component transform block includes one or more transform coefficients other than 0. The coded block flag for a chroma component may be indicated by a syntax element "cbf_cb" or "cbf_cr" depending on the corresponding chroma component. That is, "cbf_cb" or "cbf_cr" may indicate whether residual information is present for the chroma components of a transform block.

When quantization parameter (QP) adaptation in the unit of CU is applied, that is, when a QP is adaptively determined in the unit of CU, QP delta information may be transmitted from the video encoder to the video decoder. Here, the QP delta information means information indicating a different value between the value of a quantization parameter for a CU and the predicted value of the quantization parameter.

For example, the QP delta information may be transmitted from the video encoder to the video decoder through the use of a syntax element "cu_qp_delta". For example, the QP delta information may be transmitted through the use of syntax elements of "cu_qp_delta_abs" indicating the absolute value of the difference value between the value of the quantization parameter for the CU and the predicted value of the quantization parameter and "cu_qp_delta_sign" indicating the sign of the difference value.

The names of the syntax elements and the parameters described in the above-mentioned embodiment are arbitrary and the invention is not limited to the names. The names of the syntax elements and the parameters defined in this specification are arbitrary, and the syntax elements and the parameters having functions identical or similar thereto are included in the scope of the invention regardless of the names. When a syntax element or a parameter or a parameter having the same name as in the above-mentioned embodiment is mentioned in this specification, the syntax element or the parameter may be analyzed to have the same meaning in the above-mentioned embodiment.

On the other hand, entropy coding (entropy encoding/entropy decoding) may be used to process video information requiring high coding efficiency. Video information may be entropy-encoded and then may be transmitted to the video decoder as described above with reference to FIG. 1. The video decoder may entropy-decode a received bitstream to acquire the video information as described above with reference to FIG. 2.

CABAC (Context-based Adaptive Binary Arithmetic Code) may be used to entropy-encode/decode video information. In the CABAC, the term, "context-based", may mean that a coding method having higher encoding/decoding efficiency is adaptively selected depending on circumstances. In this regard, use of different contexts may mean that coding is performed using different probability models by independently updating contexts.

Embodiments of the entropy-encoding/entropy-decoding methods based on the CABAC will be described below.

Figure 4:
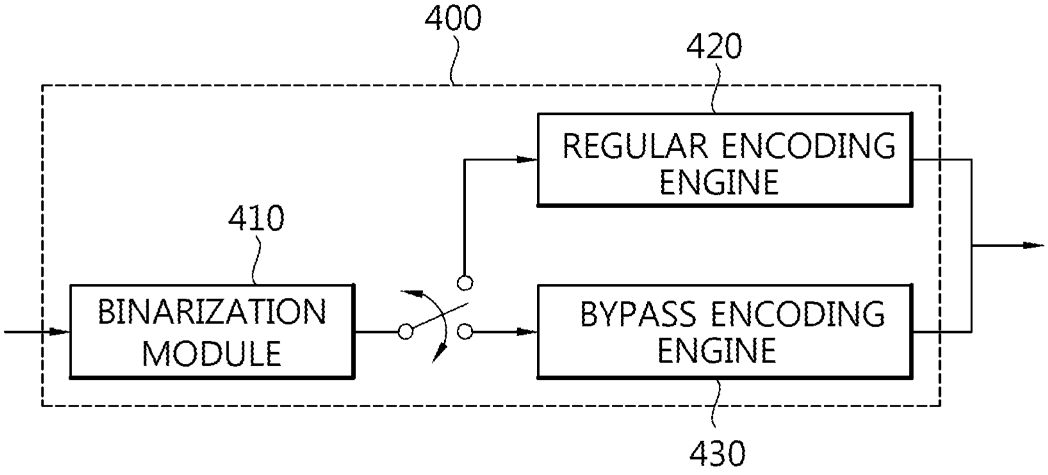
FIG. 4 is a block diagram schematically illustrating an example of a configuration of an entropy encoding module according to the invention.

FIG. 4 is a block diagram schematically illustrating an example of a configuration of an entropy encoding module according to the invention.

Referring to FIG. 4, an entropy encoding module 400 includes a binarization module 410, a regular encoding engine 420, and a bypass encoding engine 430. Here, the entropy encoding module 400 may be the entropy encoding module 130 illustrated in FIG. 1.

The value of a syntax element may be input to the binarization module 410. The binarization module 410 may convert the value of the syntax element into a bin string and may output the bin string. Here, the bin string may mean a binary sequence or a binary code including one or more bins. The bin may mean a value (0 or 1) of each digit constituting a binary sequence (or binary code) when the value of a symbol and/or a syntax element is binarized to a binary sequence (or binary code).

A predetermined binarization method or a predetermined binarization type may be applied to each syntax element and the binarization method may be determined to be different depending on the syntax elements. Examples of the binarization type that can be applied to syntax elements include unary binarization, truncated unary binarization, truncated rice binarization, Exp-Golomb binarization, and fixed-length binarization.

A binarized signal (bin string) may be input to the regular encoding engine 420 or the bypass encoding engine 430. The entropy encoding module 400 may determine whether to perform the entropy encoding using the regular encoding engine 420 or to perform the entropy encoding using the bypass encoding engine 430 and may switch an encoding path. The regular encoding engine 420 and the bypass encoding engine 430 may perform arithmetic encoding.

The regular encoding engine 420 may allocate a context reflecting a probability value to the corresponding bin and may encode the bin on the basis of the allocated context. The regular encoding engine 420 may update the probability and/or the context for the corresponding bin after encoding the bins.

The bypass encoding engine 430 may not allocate a context to an input bin but encode a bin input through a simple bypass mode, thereby enhancing an encoding rate. In the bypass mode, the process of estimating the probability for the input bin and the process of updating the probability applied to the bin may be bypassed. For example, in the bypass mode, a uniform probability distribution may be applied to perform the encoding process.

Figure 5:
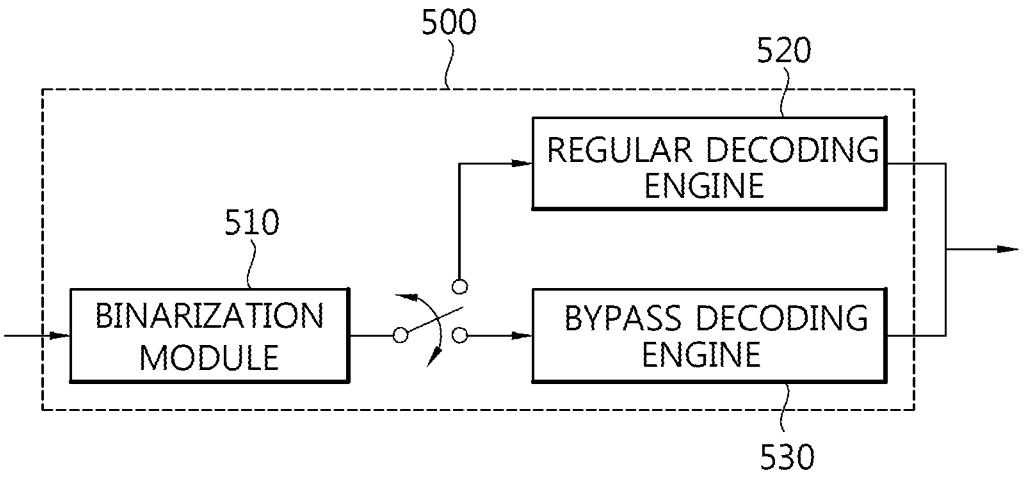
FIG. 5 is a block diagram schematically illustrating an example of a configuration of an entropy decoding module according to the invention.

FIG. 5 is a block diagram schematically illustrating an example of a configuration of an entropy decoding module according to the invention.

Referring to FIG. 5, the entropy decoding module 500 includes a binarization module 510, a regular decoding engine 520, and a bypass decoding engine 530. Here, the entropy decoding module 500 may be the entropy decoding module 210 illustrated in FIG. 2.

The binarization module 510 may derive binarization of a syntax element in response to a request to the syntax element. Here, the derivation of "binarization" may mean a process of acquiring bin strings (or binary codes) by performing binarization on possible values of the syntax element. That is, the binarization result for the syntax element in FIG. 5 may mean binary codes for the possible values of the syntax element.

As described above, a predetermined binarization method or a predetermined binarization type may be applied to each syntax element and the binarization method may be determined to be different depending on the syntax elements. Examples of the binarization type that can be applied to syntax elements include unary binarization, truncated unary binarization, truncated rice binarization, Exp-Golomb binarization, and fixed-length binarization.

The "binarization" of each syntax element may be derived by the binarization module 510 through a predetermined calculation process, and a predetermined table or resultant values indicating the "binarization" may be stored in advance in the video decoder. When the binarization results (for example, a mapping relationship between the syntax element values and the binary codes) of an input signal are stored in advance in the video decoder, the input signal may not be processed by the binarization module 510. In this case, the configuration of the binarization module 510 may be removed from the example illustrated in FIG. 5.

The entropy decoding module 500 may determine whether to perform the decoding using the regular decoding engine 520 or to perform the decoding using the bypass decoding engine 530 for each bin of a requested syntax element. This process may be performed by the binarization module 510 or may be performed by a separate configuration independent of the binarization module 510.

When a syntax element (or bins of the syntax element) is decoded using the regular decoding engine 520, the entropy decoding module 500 may set offset values to define different context depending on a slice type. The process of setting offset values may be performed by the binarization module 510 or may be performed by a separate configuration independent of the binarization module 510.

The offset values may be used to derive context indices. Here, a context index may mean an index indicating a context to be applied to a decoding target bin. The offset in this specification is referred to as a context index offset and may be indicated, for example, by "ctxIdxOffset".

For example, the values of context index offsets may be determined depending on the slice type of a current slice. That is, the values of context index offset values may be determined depending on whether the current slice is an I slice, a P slice, or a B slice. Since the values of the context index offsets are used to derive context indices, the entropy decoding module 500 may allocate different context indices to the same bin index depending on the slice type of the current slice.

When it is determined to use the regular decoding engine, the regular decoding engine 520 may perform a decoding process based on contexts.

In the entropy-encoded values for the syntax elements, the bins may be indexed by bin indices. For example, a bin index value of 0 may be allocated to the first bin, a bin index value of 1 may be allocated to the second bin, and a bin index value of n−1 may be allocated to the n-th bin (where n is an integer of 0 or greater). The regular decoding engine 520 may derive a context index ctxIdx for each bin.

In order to derive context indices, the regular decoding engine 520 may determine context index increments on the basis of the requested syntax element and the bin indices of the bins to be decoded. For example, the regular decoding engine 520 may determine the context index increments on the basis of a "context table" stored in advance in the video decoder. The context index increments may be indicated, for example, by a parameter "ctxIdxInc". The regular decoding engine 520 may derive the context index of the corresponding bin by adding the context index increment to the context index offset. That is, the context index ctxIdx may be indicated by the sum of the context index offset ctxIdxOffset determined depending on the slice type and the context index increment ctxIdxInc determined for each bin.

When the context index is derived, the regular decoding engine 520 may perform an arithmetic decoding process on the decoding target bin on the basis of the context index. Here, a probability parameter pStateIdx initialized on the basis of the context index may be used for the arithmetic decoding process. Here, the probability parameter may mean a parameter indicating the occurrence probability of a bin. The initial value for deriving the probability parameter may be determined using the context index and a "context index table". The context index table applied to the corresponding syntax element may be specified by a predetermined index, for example, a context index table index ctxIdxTable. The regular decoding engine 520 may update the probability parameter (and/or context) of the corresponding bin after performing the decoding on the respective bins.

When the bypass decoding engine is determined to be used, the bypass decoding engine 530 may perform the decoding using a uniform probability distribution. Accordingly, the bypass decoding engine 530 may not derive the context indices unlike the regular decoding engine 520.

A binary code may be output through the decoding in each of the regular decoding engine 520 and the bypass decoding engine 530.

When the decoding engines complete the decoding on all the bins of a specific syntax element, the entropy decoding module 500 may determine on what syntax element the binary code as the sum of all the bins of the corresponding syntax element is mapped. Here, for example, the "binarization" result derived by the binarization module 510 may be used. When the output final binary code is mapped on a specific syntax element value, the value may be determined to the value of the syntax value.

Figure 6:
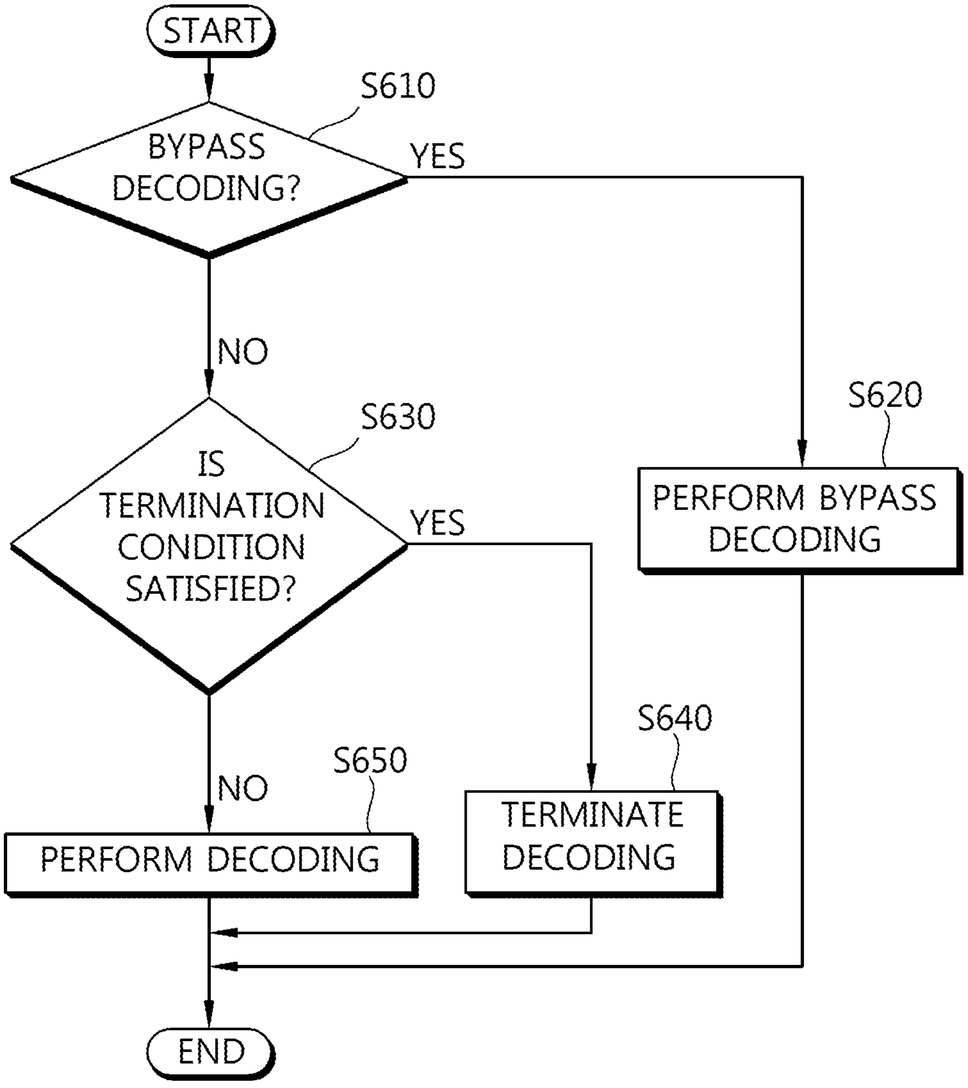
FIG. 6 is a flowchart schematically illustrating an example of an entropy decoding process according to the invention.

FIG. 6 is a flowchart schematically illustrating an example of an entropy decoding process according to the invention. For the purpose of convenience of explanation, FIG. 6 illustrates a decoding process on a single bin as an example.

The decoding process illustrated in FIG. 6 may be performed by the video decoder, more specifically, by the entropy decoding module of the video decoder. For the purpose of convenience of explanation, it is assumed that the processes are performed by the entropy decoding module.

Referring to FIG. 6, the entropy decoding module may determine whether to perform bypass decoding on an input target bin to be decoded (S610). The entropy decoding module may determine whether to perform the bypass decoding on the basis of information on the target bin. For example, when a fixed context based on a table is used, the entropy decoding module may determine whether to perform the bypass decoding on the basis of an instruction allocated to the corresponding syntax element in the table. When the fixed context based on the table is used, the entropy decoding module may determine whether to perform the bypass decoding on the basis of an index, an offset, and the like allocated to the corresponding syntax element in the table.

When it is determined that the bypass decoding is performed, the entropy decoding module may perform the bypass decoding on the input bin (S620). When the bypass decoding is performed, the entropy decoding module may use a uniform probability distribution like the encoding. The entropy decoding module may compare a code interval range codIRange and a code interval offset codIOffset and may allocate the value of the bin, depending on the state of the bypass decoding engine. For example, the value of the bin may be set to 1 when the code interval offset is equal to or greater than the code interval range, and the value of the bin may be set to 0 when the code interval offset is less than the code interval range. Here, in order to directly compare the code interval range and the code interval offset, the code interval range or the value of the code interval offset may be appropriately adjusted.

When it is determined in step S610 that the bypass decoding is not performed, the entropy decoding module may determine whether a decoding termination condition is satisfied (S630). For example, when the value of the context index ctxIdx is 0 and the value of the context index table index ctxIdxTable is 0, the entropy decoding module may terminate the decoding process. Whether the terminal condition is satisfied may not be determined on the basis of the values of the indices, but may be determined on the basis of flag information or syntax information transmitted from the video encoder. Here, the termination condition indicated by the flag information or the syntax information and the termination condition determined on the basis of the index values may be equal to each other.

When the termination condition is satisfied, the entropy decoding module may terminate the decoding process as described above (S640). The entropy decoding module may allocate a predetermined set value to the value of the bin before terminating the decoding process. Here, the entropy decoding module may allocate the value of the bin by the bypass decoding.

When the termination condition is not satisfied, the entropy decoding module may perform the decoding process (S650). The entropy decoding module may perform the arithmetic decoding on the bin to be decoded on the basis of the bin index (for example, binIdx) indicating the bin to be decoded and the context index (for example, ctxIdx) indicating the context to be applied to the bin to be decoded.

Figure 7:
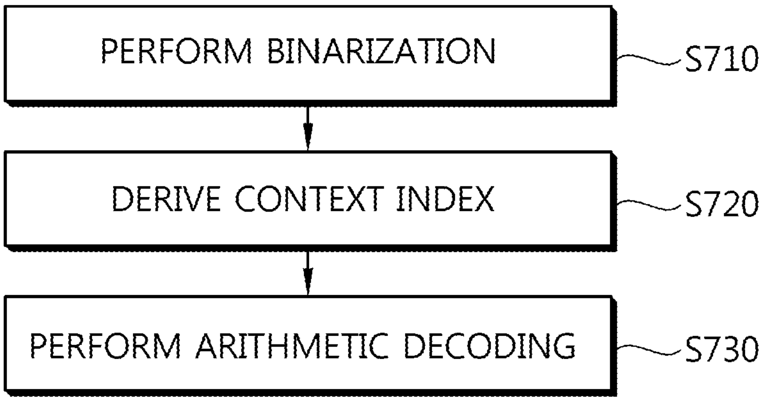
FIG. 7 is a flowchart schematically illustrating an example of an entropy decoding process when a regular decoding engine is used.

FIG. 7 is a flowchart schematically illustrating an example of the entropy decoding process when the regular decoding engine is used. For the purpose of convenience of explanation, FIG. 7 illustrates a decoding process on a single bin as an example.

The decoding process illustrated in FIG. 7 may be performed by the video decoder, more specifically, by the entropy decoding module of the video decoder. For the purpose of convenience of explanation, it is assumed that the processes are performed by the entropy decoding module.

Referring to FIG. 7, the entropy decoding module may derive binarization for the corresponding syntax element in response to a request for the syntax element (S710). Here, the deriving of "binarization" may mean a process of acquiring bin strings (or binary codes) by performing a binarization process on the possible values of the syntax element. As described above, when the binarization result (for example, the mapping relationship between the syntax element values and the binary codes) of an input signal is stored in advance in the video decoder, the binarization deriving process of S710 may be skipped. A specific example of the binarization method or the like is described above with reference to FIG. 5 and thus description thereof will not be repeated.

Referring to FIG. 7 again, the entropy decoding module may derive the context index (ctxIdx) of the bin to be decoded (S720).

As described above, the entropy decoding module may determine the value of the context index offset (ctxIdxOffset) for the syntax element so that different contexts are defined depending on the slice types. The value of the context index offset may be determined depending on whether a current slice is an I slice, a P slice, or a B slice.

In the entropy-encoded values for the syntax elements, the bins may be indexed by bin indices. The entropy decoding module may determine a context index increment on the basis of the requested syntax element and the bin index of the bin to be decoded. For example, the entropy decoding module may determine the context index increment on the basis of the "context table" stored in advance in the video decoder.

The entropy decoding module may derive the context index of the bin to be decoded by adding the context index offset value and the context index increment.

Referring to FIG. 7 again, the entropy decoding module may perform the arithmetic decoding process on the bin to be decoded on the basis of the context index (S730). Here, the probability parameter (pStateIdx) initialized on the basis of the context index may be used for the arithmetic decoding process.

When the decoding engines complete the decoding on all the bins of a specific syntax element, the entropy decoding module may determine on what syntax element the binary code as the sum of all the bins of the corresponding syntax element is mapped. Here, for example, the "binarization" result derived in S710 may be used. When the output final binary code is mapped on a specific syntax element value, the value may be determined to the value of the syntax value.

A decoding method using a context will be described below in more detail.

Here, a context may be indicated by a context index increment (ctxIdxInc), a context index (ctxIdx), and/or a probability or a probability parameter derived by the context index.

As described above, the context index may be indicated by the sum of the context index (ctxIdxOffset) determined depending on the slice type and the context index increment (ctxIdxInc) determined for each bin. The context index increment may be determined on the basis of the requested syntax element and the bin indices of bins to be decoded.

Since the context index increment corresponds to a factor for deriving the context index along with the context index offset, the "context index increment" determined by a bin to be decoded, which has bin index corresponding to the context index increment, may be referred to as a "context index" for the purpose of convenience of explanation in embodiments to be described later. In this case, the type of an actual context used to express a probability model or to derive a probability parameter may be considered to be indicated by the sum of the "context index" and the "context index offset". This distinction can be apparently understood by those skilled in the art.

Some embodiments to be described later may be described without considering the context index offset determined depending on the slice type. The context applied to a bin to be decoded in such embodiments may be considered to be determined without depending on the slice type and the "context index increment" referred to as the "context index" may be considered to indicate the context of the bin to be decoded.

However, the invention is not limited to this configuration. In the embodiments in which the context index offsets are not considered in this specification, the context index offsets determined depending on the slice type may be additionally applied. In this case, the actual context of the bin to be decoded may be considered to be indicated by the sum of the "context index offset" and the "context index increment" referred to as the context index.

As described above, the entropy coding (entropy encoding/entropy decoding) may be used to process video information requiring high coding efficiency. A variable length coding (VLC), the CABAC (Context-based Adaptive Binary Arithmetic Code), and the like in addition to the basic coding method such as the Expo-Golomb may be used for the entropy coding.

In the CABAC, the term, "context-based", may mean that a coding method having higher encoding/decoding efficiency is adaptively selected depending on circumstances. In this regard, use of different contexts may mean that the coding is performed using different probability models by independently updating the contexts or updating the probabilities.

The following methods may be considered as the method of using the contexts for the coding in the CABAC.

<Context Utilizing Method>

(a) Method of calculating contexts depending on circumstances and using the contexts for coding (b) Method of defining a specific context table in advance so as to use a fixed context and using the context designated in the defined context table (c) Bypass coding (bypass encoding/bypass decoding) method of coding (encoding/decoding) a binary code without referring to contexts.

(d) Method of using Methods (a) to (c) by selective combination thereof.

Since Method (a) of the context utilizing methods includes a process of calculating contexts in consideration of circumstances before performing the coding, Method (a) may have the highest complexity. For example, the video encoder may calculate contexts by bins constituting a binary code of a syntax element to be coded in consideration for circumstances, for example, contexts applied to the previous and subsequent bins or contexts of blocks (for example, a left block or an upper block) coded previously to a current block. The video encoder may transmit information on the calculated contexts to the video decoder. The video decoder may perform decoding on the corresponding bins on the basis of the received context information. For example, the video decoder may not determine and transmit the contexts of the bins, but the video encoder and the video decoder may calculate the contexts in consideration of circumstances using the same method.

Method (b) of the context utilizing methods is a method of setting a context table in which context indices are allocated to the bins constituting the binary code of a specific syntax element in advance and using the contexts indicated by the context indices allocated in the context table for decoding the corresponding bins without calculating the contexts every time like in Method (a). When Method (b) is used, a fixed context may be used for each bin.

Table 1 is a table schematically illustrating an example of a context table representing a mapping relationship between bin indices and context indices allocated to the bins when Method (b) is used.

TABLE 1

| | bin index (binIdx) | | | | |
|---|---|---|---|---|---|
| Syntax element | 0 | 1 | 2 | 3 | 4 |
| context index by bin | Idx0 | Idx1 | Idx2 | Idx3 | Idx4 |

Table 1 shows an example of the context table applied to a corresponding syntax element when it is assumed that the entropy coding is performed on the specific syntax element.

In the example of Table 1, the bin index binIdx may indicate a specific bin out of bins constituting a binary code of a syntax element. Here, the binary code may be a binary code encoded on the basis of the contexts of the syntax element. The encoded binary code may be referred to as a codeword.

For example, the value of binIdx of 0 may indicate the first bin out of the bins constituting the codeword (or binary code) of the syntax element, and the value of binIdx of 3 may indicate the fourth bin out of the bins constituting the codeword (or binary code) of the syntax element. The syntax element may be a syntax element transmitted from the video encoder to the video decoder, such as cbf_luma, cu_qp_delta, and inter_pred_flag.

Referring to the example of Table 1, context indices may be allocated to the bins 0 to 4 constituting the codeword (or binary code) of the syntax element, respectively. The context indices Idx0 to Idx4 may have different values. The context index may indicate a context (and/or a probability model) to be applied to the corresponding bin to be decoded. For example, the probability parameter (pStateIdx) may be initialized on the basis of the context index and the initial value for deriving the probability parameter may be determined on the basis of a particular context index table. That is, the context indicated by the context index may be allocated using a particular context index table.

The bins constituting the codeword (or binary code) of the syntax element may be decoded on the basis of the contexts (and/or probability models) indicated by the context indices allocated thereto.

When a syntax element is entropy-decoded, the video decoder may use the context, which is indicated by the context index allocated to a specific bin, to decode the specific bin. For example, when the bin index value is 0, the first bin may be decoded using the context indicated by Idx0.

In the example of Table 1, the maximum value maxBinIdxCtx of the bin indices is 4, but the maximum value of the bin indices may be greater than 4 or smaller than 4. Here, no context index may be allocated to the bin indices greater than the maximum value or NA (not available) may be allocated thereto.

Method (c) of the context utilizing methods has complexity lower than that of Method (a) or (b). In the bypass coding used in Method (c), a uniform probability distribution is used as described above, and the bypass coding may be applied for the purpose of fast coding. Details of the bypass coding are described above and thus specific description thereof will not be repeated.

In CABAC-decoding of a specific binary code, contexts may be applied to numerals 0 or 1 of digits constituting the binary code. Here, the binary code may be a binary code encoded on the basis of the contexts of the syntax element. The numerals 0 or 1 of digits constituting the binary code may be referred to as a bin as described above. For example, when the binary code (or codeword) is 110, the first bin is 1, the second bin 1, and the third bin is 0.

In the CABAC coding, contexts may be determined in various ways for the bins constituting the codeword (or binary code) of the syntax element.

<Method of Determining Context of Bin Constituting Codeword (or Binary Code)>

(A) Independent contexts may be applied to the bins constituting a codeword (or binary code) of a syntax element.

(B) The same context may be commonly applied to the bins constituting the codeword (or binary code) of the syntax element (C) The bypass mode may be applied to the bins constituting the codeword (or binary code) of the syntax element. That is, the bypass coding may be performed on the bins constituting the codeword (or binary code) of the syntax element.

(D) Methods (A) to (C) may be combined to determine the contexts of the bins constituting the codeword (or binary code) of the syntax element.

In Method (A), independent contexts may be applied to the bins constituting the codeword (or binary code) of the syntax element. Accordingly, the contexts of the bins may be independently updated. In Method (B), the same context may be applied to the bins constituting the codeword (or binary code) of the syntax element and may be updated in the same way. In Method (C), since all the bins constituting the codeword (or binary code) of the syntax element are coded in the bypass mode, fast decoding may be performed.

In Method (D), Methods (A) to (C) may be combined and applied. For example, independent contexts may be applied to some bins of the bins constituting the codeword (or binary code) of the syntax element and the same context may be commonly applied to some bins. Independent contexts may be applied to some bins of the bins constituting the codeword (or binary code) of the syntax element and the bypass mode may be applied to some bins. The same context may be applied to some bins of the bins constituting the codeword (or binary code) of the syntax element and the bypass mode may be applied to some bins. Independent contexts may be applied to some bins of the bins constituting the codeword (or binary code) of the syntax element, the same context may be commonly applied to some bins, and the bypass mode may be applied to some bins.

On the other hand, Methods (A) to (D) of determining contexts of the bins constituting the codeword (or binary code) of the syntax element may be performed along with Methods (a) to (d) of utilizing the contexts.

For example, on the basis of Method (A), in a specific syntax (syntax element), independent contexts may be applied to all the bins constituting the codeword (or binary code) of the syntax (syntax element) and the independent contexts may be calculated for the respective bins in consideration of circumstances. In a specific syntax (syntax element), independent contexts may be applied to all the bins constituting the codeword (or binary code) of the syntax (syntax element), and the independent contexts may be indicated using a predetermined context table.

Table 2 shows an example where context indices are allocated using a predetermined context table when independent context indices are allocated to the bins constituting the codeword (or binary code) of a syntax element.

TABLE 2

| | bin index (binIdx) | | | | |
|---|---|---|---|---|---|
| Syntax element A | 0 | 1 | 2 | 3 | 4 |
| context index by bin | Idx0 | Idx1 | Idx2 | Idx3 | Idx4 |

Table 2 shows an example of a context table applied to specific syntax element A when entropy-coding is performed on syntax element A.

In Table 2, the context indices by bin (Idx0 to Idx4) may independently indicate contexts to be applied to the corresponding bins. Here, the contexts indicated by the context indices may be independently updated.

In the example of Table 2, the maximum value maxBinIdxCtx of the bin indices is 4, but the maximum value of the bin indices may be greater than 4 or smaller than 4. Here, no context index may be allocated to the bin indices greater than the maximum value or NA (not available) may be allocated thereto.

On the other hand, in a specific syntax (syntax element), independent contexts may be applied to some bins of the bins constituting the codeword (or binary code) of the syntax (syntax element) and the bypass mode may be applied to some bins. Here, the context indices or the bypass mode may be set independently by the bins in a predetermined context table. For example, the context indices may be calculated in consideration of circumstances as described above.

Table 3 shows an example of a context table that can be used when independent contexts are applied to some bins of the bins constituting the codeword (or binary code) of a specific syntax (syntax element) and the bypass mode is applied to some bins.

TABLE 3

| | bin index (binIdx) | | | | |
|---|---|---|---|---|---|
| Syntax element B | 0 | 1 | 2 | 3 | 4 |
| context index by bin | Idx0 | bypass | Idx1 | bypass | Idx2 |

Table 3 shows an example of a context table applied to specific syntax element B when entropy-coding is performed on syntax element B.

In the example of Table 3, independent contexts may be applied to the first, third, and fifth bins of the bins constituting the codeword (or binary code) of syntax element B, and the bypass mode may be applied to the second and fourth bins.

In the example of Table 3, the maximum value maxBinIdxCtx of the bin indices is 4, but the maximum value of the bin indices may be greater than 4 or smaller than 4. Here, no context index may be allocated to the bin indices greater than the maximum value or NA (not available) may be allocated thereto.

On the basis of Method (A) and Method (B), in a specific syntax (syntax element), independent contexts may be applied to some bins of the bins constituting the codeword (or binary code) of the syntax (syntax element) and the same contex may be commonly applied to some bins. For example, the context indices may be calculated for the corresponding bins in consideration of circumstances. For example, the context indices may be indicated using a predetermined context table.

Table 4 shows an example where context indices are allocated using a predetermined context table when independent contexts are applied to some bins of the bins constituting the codeword (or binary code) of a syntax element and the same context is commonly applied to some bins.

TABLE 4

| | bin index (binIdx) | | | | |
|---|---|---|---|---|---|
| Syntax element C | 0 | 1 | 2 | 3 | 4 |
| context index by bin | Idx0 | Idx1 | Idx1 | Idx2 | Idx3 |

Table 4 shows an example of a context table applied to specific syntax element C when entropy-coding is performed on syntax element C.

In Table 4, the context indicated by the context index Idx1 may be applied to the second and third bins. The contexts indicated by the context indices Idx0, Idx2, and Idx3 may be applied to the first, fourth, and fifth bins. The context indices Idx0 to Idx3 may have values different from each other, and the contexts indicated by the context indices may be independently updated.

In the example of Table 4, the maximum value maxBinIdxCtx of the bin indices is 4, but the maximum value of the bin indices may be greater than 4 or smaller than 4. Here, no context index may be allocated to the bin indices greater than the maximum value or NA (not available) may be allocated thereto.

On the other hand, in a specific syntax (syntax element), independent contexts may be applied to some bins of the bins constituting the codeword (or binary code) of the syntax (syntax element), the same context may be commonly applied to some bins, and the bypass mode may be applied to some bins.

Here, for example, the context indices may be calculated in consideration of circumstances. For example, the context indices or the bypass mode may be set or indicated by bins in a predetermined context table.

Table 5 shows an example of a context table that can be used when independent contexts are applied to some bins of the bins constituting the codeword (or binary code) of a specific syntax (syntax element), the same context is commonly applied some bins, and the bypass mode is applied to some bins.

TABLE 5

| | bin index (binIdx) | | | | |
|---|---|---|---|---|---|
| Syntax element D | 0 | 1 | 2 | 3 | 4 |
| context index by bin | Idx0 | bypass | Idx1 | Idx2 | Idx2 |

Table 5 shows an example of a context table applied to specific syntax element D when entropy-coding is performed on syntax element D.

In the example of Table 5, the context indicated by the context index Idx0 may be applied to the first bin of the bins constituting the codeword (or binary code) of syntax element D, the bypass mode may be applied to the second bin, the context indicated by the context index Idx1 may be applied to the third bin, and the context indicated by the context indices Idx2 may be applied to the fourth and fifth bins.

In the example of Table 5, the maximum value maxBinIdxCtx of the bin indices is 4, but the maximum value of the bin indices may be greater than 4 or smaller than 4. Here, no context index may be allocated to the bin indices greater than the maximum value or NA (not available) may be allocated thereto.

On the other hand, on the basis of Method (B), the same context may be commonly applied to the bins constituting the codeword (or binary code) of a specific syntax (syntax element). For example, the context index commonly applied may be calculated for the corresponding bins in consideration of circumstances. For example, the context index commonly applied may be allocated using a predetermined context table.

Table 6 shows an example of a context table that can be used when the same context is applied to the bins constituting the codeword (or binary code) of a specific syntax (syntax element).

TABLE 6

| | bin index (binIdx) | | | | |
|---|---|---|---|---|---|
| Syntax element E | 0 | 1 | 2 | 3 | 4 |
| context index by bin | Idx0 | Idx0 | Idx0 | Idx0 | Idx0 |

Table 6 shows an example of a context table applied to specific syntax element E when entropy-coding is performed on syntax element E.

In the example of Table 6, the context indicated by the context index Idx0 may be commonly applied to the bins constituting the codeword (or binary code) of syntax element E.

In the example of Table 6, the maximum value maxBinIdxCtx of the bin indices is 4, but the maximum value of the bin indices may be greater than 4 or smaller than 4. Here, no context index may be allocated to the bin indices greater than the maximum value or NA (not available) may be allocated thereto.

In a specific syntax (syntax element), the same context may be commonly applied to some bins of the bins constituting the codeword (or binary code) of a specific syntax (syntax element), and the bypass mode may be applied to some bins.

For example, the context indices may be calculated in consideration of circumstances at the time applying contexts to the corresponding bins. For example, the context indices or the bypass mode may be set or indicated by bins in a predetermined context table.

Table 7 shows an example of a context table that can be used when the same context index is applied to some bins of the bins constituting the codeword (or binary code) of a specific syntax (syntax element) and the bypass mode is applied to some bins.

TABLE 7

| | bin index (binIdx) | | | | |
|---|---|---|---|---|---|
| Syntax element F | 0 | 1 | 2 | 3 | 4 |
| context index by bin | Idx0 | Idx0 | bypass | Idx0 | Idx0 |

Table 7 shows an example of a context table applied to specific syntax element F when entropy-coding is performed on syntax element F.

In the example of Table 7, the bypass mode may be applied to the third bin of the bins constituting the codeword (or binary code) of syntax element F and the context indicated by the context index Idx0 may be applied to the first, second, fourth, and fifth bins.

In the example of Table 7, the maximum value maxBinIdxCtx of the bin indices is 4, but the maximum value of the bin indices may be greater than 4 or smaller than 4. Here, no context index may be allocated to the bin indices greater than the maximum value or NA (not available) may be allocated thereto.

On the basis of Method (C), in a specific syntax (syntax element), the bypass mode may be applied to all the bins constituting the codeword (or binary code) of the syntax (syntax element). For example, the application of the bypass mode may be indicated using a predetermined context table for the corresponding syntax (syntax element). Here, the context table may be configured so that the bypass mode is allocated to all the bins.

On the other hand, in the context table, different context indices may be allocated to the same bin index. Here, the context index actually applied to the bin to be decoded may be determined depending on the circumstances or by predetermined computation.

The context index may differ depending on an environment (state or condition) to which the syntax (syntax element) is applied. For example, different contexts may be applied to the bin at the same position in a codeword (or binary code) depending on states or conditions such as the block type, the slice type, the prediction mode, the block size, and the block depth. Here, a certain state may be specified by another equivalent state. For example, the block size may be specified by the block depth and the block depth may be specified by the block size. Accordingly, these two conditions may be the state or condition specifying the same environment.

The context index offsets may be used to apply different contexts to the bins constituting a codeword (or binary code) depending on the state or condition. In this case, a context applied to a specific bin may be indicated by the sum of the context index values allocated to the bin indices in the context table and the context index offset values added by conditions. As described above, the context index may mean the context index increment described in the embodiments of FIGS. 4 to 7, and the value indicated by the sum of the context index offset and the context index value may correspond to the context index value described with reference to FIGS. 4 to 7. In this specification, the context index increment in the examples of Table 1 and the tables subsequent thereto is referred to as the context index for the purpose of convenience of explanation.

Table 8 schematically shows an example of a context table that can be used when different contexts are applied to the same bin on the basis of the context index offset.

TABLE 8

| | context index by bin | | | | |
|---|---|---|---|---|---|
| offset | 0 | 1 | 2 | 3 | 4 |
| A1 | B0 | B1 | B2 | B3 | B4 |
| A2 | B0 | B1 | B2 | B3 | B4 |
| A3 | B0 | B1 | B2 | B3 | B4 |

In the example of Table 8, 0 to 4 represent the bin index (binIdx) values. The context index offset values A1, A2, and A3 may be different from each other. All or some of the context indices B0, B1, B2, B3, and B4 allocated by bin indices may have different values.

In the example of Table 8, the maximum value maxBinIdxCtx of the bin indices is 4, but the maximum value of the bin indices may be greater than 4 or smaller than 4. Here, no context index may be allocated to the bin indices greater than the maximum value or NA (not available) may be allocated thereto.

The context index offset value may be set depending on a predetermined state or condition. For example, the context index offset value may be set depending on the slice type (I slice, P slice, or B slice). Here, A1 may be the offset for the I slice, A2 may be the offset for the P slice, and A3 may be the offset for the B slice. The offset value may be directly determined from the state information or condition such as the slice type or may be determined using a parameter value such as a predetermined type (for example, initType) determined by the state information or condition such as the slice type.

In each slice type, the offset values of a specific syntax element may be fixed values, but may be a values adaptively determined on the basis of flag information or the like transmitted from the video encoder. For example, in a specific syntax element, the offset A1 for the I slice may be fixed to 0, the offset A2 for the P slice may be fixed to 2, and the offset A3 for the B slice may be fixed to 4. However, the offset A2 for the P slice and the offset A3 for the B slice may be adaptively determined depending on a predetermined condition. For example, depending on the specific flag information transmitted from the video encoder, the offset A2 for the P slice and the offset A3 for the B slice may be determined to be 2 and 4, respectively, or the offset A2 for the P slice and the offset A3 for the B slice may be determined to be 4 and 2, respectively.

According to the above-mentioned examples, when the context index offset value is not applied to a specific syntax element or the same context index offset value is applied thereto regardless of the slice type, a context common to all the slice types may be applied to the same bin index. When different context index offset values are applied depending on the slice type of a specific syntax element, different contexts may be applied to the same bin index depending on whether the slice is the I slice, the P slice, or the B slice. That is, independent contexts or the common context may be applied to the bins constituting the codeword (or binary code) of the syntax element.

The examples of Tables 1 to 8 may be combined and applied to a syntax element (or the bins constituting the codeword (or binary code) of the syntax element) transmitted in the coding process. The examples of Tables 1 to 8 is not applied to only a specific syntax element, but may be applied to various syntax elements.

Specific examples of a method of determining contexts (and/or whether the bypass coding is applied) to be applied to individual syntax elements will be described below. Examples to be described below may be specific examples in which the examples of Tables 1 to 8 are combined, but the invention is not limited to the examples. The examples of Tables 1 to 8 may be combined in various forms and may be applied to the syntax elements. The examples to be described below may be described on the basis of a context table as in the examples of Tables 1 to 8. Here, the context index offsets to be applied to the corresponding syntax element, the context indices based on the bin indices, and/or whether to apply the bypass coding may be allocated using a context table.

The offset in the examples to be described below may mean the context index offset described above with reference to Table 8. In the examples to be described below, the offset values applied to the slice types (I slice, P slice, and B slice) are described to be fixed values when the entropy coding is performed on a specific syntax element. However, the invention is not limited to this example, and the offset values applied to the slice types may be adaptively determined.

For example, in the examples to be described below, an offset value of 0 may be allocated to the I slice, an offset value of 2 may be allocated to the P slice, and an offset value of 4 may be allocated to the B slice. The invention is not limited to this example, and the examples may be identically or similarly applied to a case where an offset value of 0 is allocated to the I slice, an offset value of 4 is allocated to the P slice, and an offset value of 2 is allocated to the B slice.

On the other hand, in the example of Table 8 and the examples to be described below, the context index offset values determined depending on the slice types and the context index values determined depending on the bin indices are indicated using one context table. However, the invention is not limited to this example, and the context index offset values determined depending on the slice types and the context index values determined depending on the bin indices may be indicated using different context tables. Here, the context index offset values and the context index values may be independently determined. In this case, the contexts to be applied to bins to be decoded may be indicated by the sum of the context index offset values and the context index values which are independently determined.

Table 9 shows an example of a context table that can be applied to a syntax element "inter_pred_flag". In the context table, the offsets, the context indices, and/or information indicating whether to apply the bypass mode may be set. The contexts to be applied to the bins constituting the codeword (or binary code) of the syntax element "inter_pred_flag" may be indicated by the sum of the offsets and the context indices.

TABLE 9

| example | Offset | context index by bin 0 |
|---|---|---|
| m | 0 | X |
| n | 0 | bypass |
| o | 0 | cuDepth |
| p | 0 | trafoDepth |

In Table 9, m, n, o, and p represent examples different from each other.

As described above, inter_pred_flag may indicate whether the LC prediction is applied to a current block (for example, PU) or bi-prediction is applied to the current block. Here, inter_pred_flag may be considered to indicate the inter prediction direction of the current block. Since inter_pred_flag indicates one of two values, only a bin index (binIdx) value may be present in the codeword (or binary code) of inter_pred_flag.

Referring to the example of Table 9, a context index offset value of 0 may be applied to the syntax element inter_pred_flag regardless of the slice type. Accordingly, the same context may be applied to the same bin index. However, this is only an example, and the offset values in Table 9 may be set to be different from the values shown in Table 9 so as to indicate suitable contexts, and may have different values depending on the slice type.

In Example m, a predetermined fixed context may be applied to bin index 0 of the syntax element inter_pred_flag. Here, a predetermined fixed context index (X) may be applied to bin index 0. Here, X may be a fixed value such as 0 or 1. In Example n, the bypass coding may be applied to bin index 0 of the syntax element inter_pred_flag.

On the other hand, as described above, the context index may differ depending on the environment (state or condition) in which the syntax element is applied. For example, as for the same bin (or bin index), different contexts may be applied to the bins at the same position in the codeword (or binary code) depending on the state or condition such as the depth of a block to which the syntax element is applied. In Examples o and p, the context indices are determined depending on the bit of a block or unit to which the syntax element is applied.

In Example o, the depth (cuDepth or ctDepth) value of a coding unit (CU) to which the corresponding syntax element is applied may be allocated or used as a context index to bin index 0 of the syntax element inter_pred_flag. Accordingly, in Example o, different contexts may be applied to bin index 0 of the syntax element inter_pred_flag depending on the depth of the coding unit.

In Example p, the depth (traDepth) value of a transform unit (TU) to which the corresponding syntax element is applied may be allocated or used as a context index to bin index 0 of the syntax element inter_pred_flag. Accordingly, in Example o, different contexts may be applied to bin index 0 of the syntax element inter_pred_flag depending on the depth of the transform unit.

Table 9 shows an example where the context index values by bins are specifically set. The context index values by bins in Table 9 may be set to be different from the values shown in Table 9 so as to indicate suitable contexts.

Table 10 shows an example of a context table that can be applied to a syntax element "cu_qp_delta". In the context table, the offsets, the context indices, and/or information indicating whether to apply the bypass mode may be set. The contexts to be applied to the bins constituting the codeword (or binary code) of the syntax element "cu_qp_delta" may be indicated by the sum of the offsets and the context indices.

TABLE 10

| Slice type | offset | context index by bin 0 | 1 | 2 | 3 | 4 |
|---|---|---|---|---|---|---|
| I | 0 | 0 | bypass | 1 | 2 | 2 |
| P | 3 | 0 | bypass | 1 | 2 | 2 |
| B | 6 | 0 | bypass | 1 | 2 | 2 |

As described above, cu_qp_delta may indicate a difference between the value of a quantization parameter for a CU and the predicted value of the quantization parameter.

In the example of Table 10, different offset values may be set depending on the slice type. For example, the context index offset value of cu_qp_delta may be set to 0 in the I slice, the context index offset value of cu_qp_delta may be set to 3 in the P slice, and the context index offset value of cu_qp_delta may be set to 6 in the B slice. Accordingly, in the example of Table 10, different contexts may be allocated by conditions by applying different offsets depending on the state information or the condition.

However, this is only an example, the offset values in Table 10 may be set to be different from the values shown in Table 10 so as to indicate suitable contexts, and an offset value common to all the slice types may be applied.

In Table 10, independent contexts may be applied to some bins, the same context may be commonly applied to some bins, and the bypass mode may be applied to the other bins.

For example, in the example of Table 10, a context index by bin of 0 may be allocated to bin index 0 indicating the first bin of the codeword (or binary code) of cu_qp_delta, and a context index by bin of 1 may be allocated to bin index 2 indicating the third bin of the codeword (or binary code) of cu_qp_delta. A context index by bin of 2 may be commonly allocated to bin index 3 and bin index 4 indicating the fourth bin and the fifth bin of the codeword (or binary code) of cu_qp_delta. The bypass mode may be applied to the second bin to which bin index 1 is allocated.

Table 10 shows an example where the context index values by bins are specifically set. The context index values by bins in Table 10 may be set to be different from the values shown in Table 10 so as to indicate suitable contexts.

Table 11 shows another example of a context table that can be applied to a syntax element "cu_qp_delta". In the context table, the offsets, the context indices, and/or information indicating whether to apply the bypass mode may be set. The contexts to be applied to the bins constituting the codeword (or binary code) of the syntax element "cu_qp_delta" may be indicated by the sum of the offsets and the context indices.

TABLE 11

| Slice | | context index by bin | | | | |
|---|---|---|---|---|---|---|
| type | offset | 0 | 1 | 2 | 3 | 4 |
| I | 0 | 0 | bypass | bypass | bypass | bypass |
| P | 1 | 0 | bypass | bypass | bypass | bypass |
| B | 2 | 0 | bypass | bypass | bypass | bypass |

In the example of Table 11, different offset values may be set depending on the slice type. For example, the context index offset value of cu_qp_delta may be set to 0 in the I slice, the context index offset value of cu_qp_delta may be set to 1 in the P slice, and the context index offset value of cu_qp_delta may be set to 2 in the B slice. Accordingly, in the example of Table 11, different contexts may be allocated by conditions by applying different offsets depending on the state information or the condition.

However, this is only an example, the offset values in Table 11 may be set to be different from the values shown in Table 11 so as to indicate suitable contexts, and an offset value common to all the slice types may be applied.

In Table 11, independent contexts may be applied to some bins and the bypass mode may be applied to the other bins.

For example, in the example of Table 11, a context index by bin of 0 may be allocated to bin index 0 indicating the first bin of the codeword (or binary code) of cu_qp_delta, and a context index by bin of 1 may be allocated to bin index 2 indicating the third bin of the codeword (or binary code) of cu_qp_delta. In Table 11, the bypass mode may be applied to the bins other than the first bin to which bin index 0 is allocated. That is, the bypass mode may be applied to the second bin to which bin index 1 is allocated, the third bin to which bin index 2 is allocated, the fourth bin to which bin index 3 is allocated, and the fifth bin to which bin index 4 is allocated.

Table 11 shows an example where the context index values by bins are specifically set. The context index values by bins in Table 11 may be set to be different from the values shown in Table 11 so as to indicate suitable contexts.

Table 12 shows still another example of a context table that can be applied to a syntax element "cu_qp_delta". In the context table, the offsets, the context indices, and/or information indicating whether to apply the bypass mode may be set. The contexts to be applied to the bins constituting the codeword (or binary code) of the syntax element "cu_qp_delta" may be indicated by the sum of the offsets and the context indices.

TABLE 12

| Slice | | context index by bin | | | | |
|---|---|---|---|---|---|---|
| type | offset | 0 | 1 | 2 | 3 | 4 |
| I | 0 | bypass | bypass | bypass | bypass | bypass |
| P | 1 | bypass | bypass | bypass | bypass | bypass |
| B | 2 | bypass | bypass | bypass | bypass | bypass |

In the example of Table 12, different offset values may be set depending on the slice type. For example, the context index offset value of cu_qp_delta may be set to 0 in the I slice, the context index offset value of cu_qp_delta may be set to 1 in the P slice, and the context index offset value of cu_qp_delta may be set to 2 in the B slice. Accordingly, in the example of Table 12, different contexts may be allocated by conditions by applying different offsets depending on the state information or the condition.

However, this is only an example, the offset values in Table 12 may be set to be different from the values shown in Table 12 so as to indicate suitable contexts, and an offset value common to all the slice types may be applied.

In Table 12, instead of using contexts, the bypass mode may be applied to all the bins constituting the codeword (or binary code) of cu_qp_delta. For example, in the example of Table 12, the bypass mode may be applied to all of the first bin to which bin index 0 is allocated, the second bin to which bin index 1 is allocated, the third bin to which bin index 2 is allocated, the fourth bin to which bin index 3 is allocated, and the fifth bin to which bin index 4 is allocated.

In the examples of Tables 10 to 12, the codeword (or binary code) of the syntax element includes five bins, but the invention is not limited to this example. When the codeword (or binary code) of the syntax element cu_qp_delta includes bins less than five, for example, n (where $n<5$) bins, no context index may be allocated to the bin indices greater than $n-1$ or NA (not available) may be allocated thereto. When the codeword (or binary code) of the syntax element cu_qp_delta includes bins equal to or greater than five, the same context index as the context index allocated to the sixth bin may be allocated to the sixth bin or the bins subsequent thereto (for example, bin indices having a value of 5 or greater).

Table 13 shows an example of a context table that can be applied to a syntax element "no_residual_data_flag" and/or "no_residual_syntax_flag". In the context table, the offsets, the context indices, and/or information indicating whether to apply the bypass mode may be set. The contexts to be applied to the bins constituting the codeword (or binary code) of the syntax element "no_residual_data_flag" and/or "no_residual_syntax_flag" may be indicated by the sum of the offsets and the context indices.

TABLE 13

| example | offset | context index by bin<br>0 |
|---|---|---|
| t | 0 | X |
| u | 0 | bypass |

In Table 13, t and u represent examples different from each other.

As described above, the syntax element "no_residual_data_flag" and/or "no_residual_syntax_flag" may indicate whether a residual signal and/or residual information is present for a coding unit to which the syntax element is applied. Here, "no_residual_data_flag" and/or "no_residual_syntax_flag" may be considered to indicate whether a transform tree syntax is present for the coding unit to which the syntax element. Since "no_residual_data_flag" and/or "no_residual_syntax_flag" indicates one of two values, only the bin index (binIdx) value of 0 may be present in the codeword (or binary code) of "no_residual_data_flag" and/or "no_residual_syntax_flag".

Referring to the example of Table 13, the context index offset value of 0 may be applied to the syntax element "no_residual_data_flag" and/or "no_residual_syntax_flag" regardless of the slice type. Accordingly, the same context may be applied to the same bins in Table 13. However, this is only an example, and the offset values in Table 13 may be set to be different from the values shown in Table 13 so as to indicate suitable contexts, and may have different values depending on the slice type.

In Example t, a predetermined fixed context may be applied to bin index 0 of the syntax element "no_residual_data_flag" and/or "no_residual_syntax_flag". Here, a predetermined fixed context index (X) may be applied to bin index 0. Here, X may be a fixed value such as 0 or 1. In Example u, the bypass coding instead of contexts may be applied to bin index 0 of the syntax element "no_residual_data_flag" and/or "no_residual_syntax_flag".

Table 13 shows an example where the context index values by bins are specifically set. The context index values by bins in Table 13 may be set to be different from the values shown in Table 13 so as to indicate suitable contexts.

On the other hand, in the example of Table 13, the offsets and the context indices are indicated using a single context table, but the invention is not limited to this example. For example, the context index offset values determined depending on the slice type and the context index values determined depending on the bin indices may be indicated using individual tables.

Table 14 schematically shows an example of a context table in which context indices are allocated when the offset and the context index of a syntax element no_residual_syntax_flag are indicated using individual tables.

TABLE 14

| | bin index (binIdx) | | | | | |
|---|---|---|---|---|---|---|
| syntax element | 0 | 1 | 2 | 3 | 4 | >=5 |
| no_residual_syntax_flag | 0 | na | na | na | na | na |

In the example of Table 14, the context indices may be indicated by bin indices (binIdx). As described above, the context index increment is referred to as a context index for the purpose of convenience of explanation, and the context indices allocated to the bin indices in the example of Table 14 may actually mean context index increments. Accordingly, in the example of Table 14, the actual context indices of the bins constituting the codeword (or binary code) of the syntax element no_residual_syntax_flag may be determined by the sum of the offset (ctxIdxOffset) determined depending on the slice type and the context indices allocated to the bin indices.

Referring to Table 14, a context index of 0 may be allocated to bin index 0 indicating the first bin constituting the codeword (or binary code) of the syntax element no_residual_syntax_flag. NA (not available) may be allocated to the bin indices having a value of 1 or greater.

Table 14 shows an example where the context index values by bins are specifically set. The context index values by bins in Table 14 may be set to be different from the values shown in Table 14 so as to indicate suitable contexts.

Table 15 shows an example of a context table that can be applied to a syntax element "cbf_luma". In the context table according to the example of Table 15, the offsets and/or the context indices may be set. The contexts to be applied to the bins constituting the codeword (or binary code) of the syntax element "cbf_luma" may be indicated by the sum of the offsets and the context indices.

TABLE 15

| slice type | offset | context index by bin<br>0 |
|---|---|---|
| I | 0 | (trafoDepth==0) \|\| (log2TrafoSize ==Log2MaxTrafoSize) ? 1:0 |
| P | 2 | (trafoDepth==0) \|\| (log2TrafoSize ==Log2MaxTrafoSize) ? 1:0 |
| B | 4 | (trafoDepth==0) \|\| (log2TrafoSize ==Log2MaxTrafoSize) ? 1:0 |

As described above, the syntax element "cbf_luma" may indicate whether the transform block of a luma component to which the syntax element is applied includes a transform coefficient other than 0. Since "cbf_luma" indicates one of two values, a context index may be allocated to the bin index (binIdx) value of 0 in the codeword (or binary code) of "cbf_luma".

In the example of Table 15, different offset values may be set depending on the slice type. For example, the context index offset value of cbf_luma may be set to 0 in the I slice, the context index offset value of cbf_luma may be set to 2 in the P slice, and the context index offset value of cbf_luma may be set to 4 in the B slice. Accordingly, in the example of Table 15, different contexts may be allocated by conditions by applying different offsets depending on the state information or the condition.

However, this is only an example, and the offset values in Table 15 may be set to be different from the values shown in Table 15 so as to indicate suitable contexts, and may have different values depending on the slice type. For example, the context index offset value of cbf_luma may be set to 0 in the I slice, the context index offset value of cbf_luma may be set to 4 in the P slice, and the context index offset value of cbf_luma may be set to 2 in the B slice. Alternatively, a common offset value may be applied to all the slice types.

On the other hand, as described above, the context index may differ depending on the environment (state or condition) in which the syntax element is applied. For example, as for the same bin (or bin index), different contexts may be applied to the bins at the same position in the codeword (or binary code) depending on the state or condition such as the depth or the size of a block in which the syntax element is applied. In the example of Table 15, a context may be applied to bin index 0 of cbf_luma on the basis of the partition depth (for example, trafoDepth) of a current transform unit, the size of the current transform unit (for example, the size of the current transform unit may be indicated by log2TrafoSize), and the largest transform size (for example, the largest transform may be indicated by log2MaxTrafoSize) allowable in a current sequence. Here, the current transform unit may mean a transform unit to which the syntax element cbf_luma is applied.

Referring to Table 15, when the depth value (trafoDepth) of the transform unit to which the syntax element cbf_luma will be applied is 0, a context index of 1 may be allocated to bin index 0 of cbf_luma. When the depth value (trafoDepth) of the transform unit to which the syntax element cbf_luma will be applied is not 0, the context index to be allocated to bin index 0 may be determined depending on the relationship between the size of the current transform unit and the largest transform size. For example, a context index of 1 may be allocated to bin index 0 when the size (log2TrafoSize) of the current transform unit and the largest transform size (log2MaxTrafoSize) are equal to each other, and a context index of 0 may be allocated to bin index when the size (log2TrafoSize) of the current transform unit and the largest transform size (log2MaxTrafoSize) are not equal to each other That is, in the example of Table 15, when the depth value (trafoDepth) of the transform unit is 0 or when the size (log2TrafoSize) of the current transform unit and the largest transform size (log2MaxTrafoSize) are equal to each other, a context index of 1 may be allocated to bin index 0. Otherwise, a context index of 0 may be allocated to bin index 0.

Table 16 shows another example of a context table that can be applied to a syntax element "cbf_luma". With the context table according to the example of Table 16, the offsets and/or the context indices may be assigned. The contexts to be applied to the bins constituting the codeword (or binary code) of the syntax element "cbf_luma" may be indicated by the sum of the offsets and the context indices.

TABLE 16

| slice type | offset | context index by bin 0 |
|---|---|---|
| I | 0 | (trafoDepth==0) ? 1: 0 |
| P | 2 | (trafoDepth==0) ? 1: 0 |
| B | 4 | (trafoDepth==0) ? 1: 0 |

In the example of Table 16, different offset values may be set depending on the slice type. For example, the context index offset value of cbf_luma may be set to 0 in the I slice, the context index offset value of cbf_luma may be set to 2 in the P slice, and the context index offset value of cbf_luma may be set to 4 in the B slice. Accordingly, in the example of Table 16, different contexts may be allocated by conditions by applying different offsets depending on the state information or the condition.

However, this is only an example, and the offset values in Table 16 may be set to be different from the values shown in Table 16 so as to indicate suitable contexts, and may have different values depending on the slice type. For example, the context index offset value of cbf_luma may be set to 0 in the I slice, the context index offset value of cbf_luma may be set to 4 in the P slice, and the context index offset value of cbf_luma may be set to 2 in the B slice. Alternatively, a common offset value may be applied to all the slice types.

On the other hand, in the example of Table 15, when the depth value (trafoDepth) of the current transform unit is not 0 and the size (log2TrafoSize) of the current transform unit and the largest transform size (log2MaxTrafoSize) are equal to each other, a context index of 1 may be allocated to bin index 0. However, when the occurrence frequency in which the depth value (trafoDepth) of the current transform unit is not 0 and the size (log2TrafoSize) of the current transform unit and the largest transform size (log2MaxTrafoSize) are equal to each other is small, the process of comparing the size (log2TrafoSize) of the current transform unit and the largest transform size (log2MaxTrafoSize) may cause an increase in complexity in the course of driving contexts.

Accordingly, in order to prevent this problem, the process of deriving the context for bin index 0 of cbf_luma may be simplified by applying the context using only the depth value (trafoDepth) of the current transform unit. In the example of Table 16, the context index for bin index 0 of cbf_luma may be determined on the basis of the partition depth (for example, trafoDepth) of the current transform unit.

Referring to Table 16, when the depth value (trafoDepth) of the transform unit to which the syntax element cbf_luma will be applied is 0, a context index of 1 may be allocated to bin index 0 of cbf_luma. When the depth value (trafoDepth) of the transform unit to which the syntax element cbf_luma will be applied is not 0, a context index of 0 may be allocated to bin index 0 of cbf_luma.

The example of Table 16 may be considered to be an example where when the depth value (trafoDepth) of the current transform unit is not 0, a context index of 0 is allocated to bin index 0 regardless of whether the size (log2TrafoSize) of the current transform unit and the largest transform size (log2MaxTrafoSize) are equal to each other. That is, if the example of Table 15 is changed to an example where when the depth value (trafoDepth) of the current transform unit is not 0, a context index of 0 is allocated to bin index 0 regardless of whether the size (log2TrafoSize) of the current transform unit and the largest transform size (log2MaxTrafoSize) are equal to each other, the changed example may be considered to be equal to the example of Table 16.

On the other hand, in the example of Table 16, the offsets and the context indices are indicated using a single context table, but the invention is not limited to this example. For example, the context index offset values determined depending on the slice type and the context index values determined depending on the bin indices may be indicated using individual tables.

Table 16 schematically shows an example of a context table in which the offsets are allocated when the offset and the context index of a syntax element cbf_luma are indicated using individual tables.

TABLE 17

| syntax element | initType | binarization type | maxBinIdxCtx | ctxIdxTable | ctxIdxOffset |
|---|---|---|---|---|---|
| cbf_luma | 0 | FL, | 0 | Table 9-23 | 0 |
| | 1 | cMax = 1 | 0 | Table 9-23 | 2 |
| | 2 | | 0 | Table 9-23 | 4 |

In the example of Table 17, the context index offset "ctxIdxOffset" may be determined depending on "initType". Here, initType may correspond to the initial value determined depending on the slice type. For example, the value of initType for the I slice may be 0, the value of initType for the P slice may be 1, and the value of initType for the B slice may be 2. Alternatively, the value of initType for the I slice may be 0, the value of initType for the P slice may be 2, and the value of initType for the B slice may be 1.

The context index offset value may be determined depending on the value of initType. Accordingly, the context index offset value may be considered to be determined depending on the slice type. For example, the offset value for the I slice may be 0, the offset value for the P slice may be 2, and the offset value for the B slice may be 4. Alternatively, the offset value for the I slice may be 0, the offset value for the P slice may be 4, and the offset value for the B slice may be 2.

In Table 17, FL may mean fixed-length binarization. That is, the binarization type applied to the syntax element cbf_luma may correspond to the fixed-length binarization. “cMax” may mean a parameter used for the fixed-length binarization.

In the example of Table 17, the maximum value (maxBinIdxCtx) of the bin indices of the syntax element cbf_luma may be set or determined to be 0. The context (or probability parameter) to be applied to a specific bin of the syntax element cbf_luma may be determined using a table (for example, “Table 9-23”) indicated by the context index table index (ctxIdxTable).

Table 18 schematically shows an example of a context table in which the context indices are allocated when the offset and the context index of a syntax element cbf_luma are indicated using individual tables.

TABLE 18

| syntax | bin index (binIdx) | | | | | |
|---|---|---|---|---|---|---|
| element | 0 | 1 | 2 | 3 | 4 | >=5 |
| cbf_luma | trafoDepth==0 ? 1 : 0 | na | na | na | na | na |

In the example of Table 18, the context indices may be indicated by bin indices (binIdx).

As described above, the context index may differ depending on the environment (state or condition) in which the syntax element is applied. For example, as for the same bin (or bin index), different contexts may be applied to the bins at the same position in the codeword (or binary code) depending on the state or condition such as the depth or the size of a block in which the syntax element is applied.

In the example of Table 18, a context index may be determined for bin index 0 of cbf_luma on the basis of the partition depth (for example, trafoDepth) of the current transform unit.

Referring to Table 18, when the depth value (trafoDepth) of the transform unit to which the syntax element cbf_luma will be applied is 0, a context index of 1 may be allocated to bin index 0 of cbf_luma. When the depth value (trafoDepth) of the transform unit to which the syntax element cbf_luma will be applied is not 0, a context index of 0 may be allocated to bin index 0 of cbf_luma. No context index may be allocated to the bin indices having a value of 1 or greater or NA (not available) may be allocated thereto.

Table 18 shows an example where the context index values by bins are specifically set. The context index values by bins in Table 18 may be set to be different from the values shown in Table 18.

Table 19 shows still another example of a context table that can be applied to a syntax element “cbf_luma”. In the context table according to the example of Table 19, the offsets and/or the context indices may be set. The contexts to be applied to the bins constituting the codeword (or binary code) of the syntax element “cbf_luma” may be indicated by the sum of the offsets and the context indices.

TABLE 19

| slice type | offset | context index by bin 0 |
|---|---|---|
| I | 0 | X |
| P | 1 | X |
| B | 2 | X |

In the example of Table 19, different offset values may be set depending on the slice type. For example, the context index offset value of cbf_luma may be set to 0 in the I slice, the context index offset value of cbf_luma may be set to 1 in the P slice, and the context index offset value of cbf_luma may be set to 2 in the B slice. Accordingly, in the example of Table 19, different contexts may be allocated by conditions by applying different offsets depending on the state information or the condition.

However, this is only an example, and the offset values in Table 19 may be set to be different from the values shown in Table 19 so as to indicate suitable contexts, and may have different values depending on the slice type. For example, the context index offset value of cbf_luma may be set to 0 in the I slice, the context index offset value of cbf_luma may be set to 2 in the P slice, and the context index offset value of cbf_luma may be set to 1 in the B slice. Alternatively, a common offset value may be applied to all the slice types.

In the example of Table 19, a predetermined fixed context may be applied to bin index 0 indicating the first bin constituting the codeword (or binary code) of the syntax element cbf_luma. Here, a predetermined fixed context index (X) may be applied to bin index 0. Here, X may be a fixed value such as 0 or 1.

Table 19 shows an example where the context index values by bins are specifically set. The context index values by bins in Table 19 may be set to be different from the values shown in Table 19 so as to indicate suitable contexts.

Table 20 shows still another example of a context table that can be applied to a syntax element “cbf_luma”. In the context table according to the example of Table 20, the offsets, the context indices, and the information on whether to apply the bypass mode may be set.

TABLE 20

| slice type | offset | context index by bin 0 |
|---|---|---|
| I | 0 | bypass |
| P | 1 | bypass |
| B | 2 | bypass |

In the example of Table 20, different offset values may be set depending on the slice type. For example, the context index offset value of cbf_luma may be set to 0 in the I slice, the context index offset value of cbf_luma may be set to 1 in the P slice, and the context index offset value of cbf_luma may be set to 2 in the B slice. Accordingly, in the example of Table 20, different contexts may be allocated by conditions by applying different offsets depending on the state information or the condition.

However, this is only an example, and the offset values in Table 20 may be set to be different from the values shown in Table 20 so as to indicate suitable contexts, and may have different values depending on the slice type. For example, the context index offset value of cbf_luma may be set to 0 in the I slice, the context index offset value of cbf_luma may be set to 2 in the P slice, and the context index offset value of cbf_luma may be set to 1 in the B slice. Alternatively, a common offset value may be applied to all the slice types.

In the example of Table 20, instead of the context, the bypass coding may be applied to bin index 0 indicating the first bin constituting the codeword (or binary code) of the syntax element cbf_luma. Here, a predetermined fixed context index (X) may be applied to bin index 0. Here, X may be a fixed value such as 0 or 1.

In the examples of Tables 15 to 20, the context index increment is referred to as a context index for the purpose of convenience of explanation, and the context indices allocated to the bin indices in the examples of Tables 15 to 20 may actually mean context index increments (ctxIdxInc). Accordingly, in the examples of Tables 15 to 20, the actual context indices of the bins constituting the codeword (or binary code) of the syntax element cbf_luma may be determined by the sum of the offset (ctxIdxOffset) determined depending on the slice type and the context indices allocated to the bin indices.

Table 21 shows an example of a context table that can be applied to syntax elements "cbf_cb" and "cbf_cr". In the context table according to the example of Table 21, the offsets and/or the context indices may be set. The contexts to be applied to the bins constituting the codeword (or binary code) of the syntax elements "cbf_cb" and "cbf_cr" may be indicated or expressed by the sum of the offsets and the context indices.

TABLE 21

| slice type | offset | context index by bin 0 |
|---|---|---|
| I | 0 | trafoDepth |
| P | 4 | trafoDepth |
| B | 8 | trafoDepth |

As described above, the syntax elements cbf_cb and cbf_cr may indicate whether the transform block of chroma components to which the syntax element is applied includes a transform coefficient other than 0. That is, cbf_cb and cbf_cr may indicate whether residual information is present for the chroma components of the transform block to which the corresponding syntax element is applied. Since cbf_cb and cbf_cr indicates one of two values, a context index may be allocated to the bin index (binIdx) value of 0 in the codeword (or binary code) of cbf_cb and cbf_cr.

In the example of Table 21, different offset values may be set depending on the slice type. For example, the context indices offset values of cbf_cb and cbf_cr may be set to 0 in the I slice, the context indices offset values of cbf_cb and cbf_cr may be set to 4 in the P slice, and the context indices offset values of cbf_cb and cbf_cr may be set to 8 in the B slice. Accordingly, in the example of Table 21, different contexts may be allocated by conditions by applying different offsets depending on the state information or the condition.

However, this is only an example, and the offset values in Table 21 may be set to be different from the values shown in Table 21 so as to indicate suitable contexts, and may have different values depending on the slice type. For example, the context index offset values of cbf_cb and cbf_cr may be set to 0 in the I slice, the context index offset values of cbf_cb and cbf_cr may be set to 8 in the P slice, and the context index offset values of cbf_cb and cbf_cr may be set to 4 in the B slice. Alternatively, a common offset value may be applied to all the slice types. On the other hand, as described above, the context index may differ depending on the environment (state or condition) in which the syntax element is applied. For example, as for the same bin (or bin index), different contexts may be applied to the bins at the same position in the codeword (or binary code) depending on the state or condition such as the depth or the size of a block in which the syntax element is applied.

In the example of Table 21, the partition depth (trafoDepth) of a current transform unit to which the corresponding syntax element is applied may be applied or utilized as the context index to bin index 0 of cbf_cb and cbf_cr.

On the other hand, in the example of Table 21, the offsets and the context indices are indicated using a single context table, but the invention is not limited to this example. For example, the context index offset values determined depending on the slice type and the context index values determined depending on the bin indices may be indicated using individual tables.

Table 22 schematically shows an example of a context table in which the offsets are allocated when the offset and the context indices of syntax elements cbf_cb and cbf_cr are indicated using individual tables.

TABLE 22

| syntax element | initType | binarization type | maxBinIdxCtx | ctxIdxTable | ctxIdxOffset |
|---|---|---|---|---|---|
| cbf_cb, | 0 | FL, | 0 | Table 9-24 | 0 |
| cbf_cr | 1 | cMax = 1 | 0 | Table 9-24 | 4 |
| | 2 | | 0 | Table 9-24 | 8 |

In the example of Table 22, the context index offset "ctxIdxOffset" may be determined depending on "initType". Here, initType may correspond to the initial value determined depending on the slice type. For example, the value of initType for the I slice may be 0, the value of initType for the P slice may be 1, and the value of initType for the B slice may be 2. Alternatively, the value of initType for the I slice may be 0, the value of initType for the P slice may be 2, and the value of initType for the B slice may be 1.

The context index offset value may be determined depending on the value of initType. Accordingly, the context index offset value may be considered to be determined depending on the slice type. For example, the offset value for the I slice may be 0, the offset value for the P slice may be 4, and the offset value for the B slice may be 8. Alternatively, the offset value for the I slice may be 0, the offset value for the P slice may be 8, and the offset value for the B slice may be 4.

In Table 22, FL may mean fixed-length binarization. That is, the binarization type applied to the syntax elements cbf_cb and cbf_cr may correspond to the fixed-length binarization. "cMax" may mean a parameter used for the fixed-length binarization.

In the example of Table 22, the maximum value (maxBinIdxCtx) of the bin indices of the syntax elements cbf_cb and cbf_cr may be set or determined to be 0. The context (or probability parameter) to be applied to a specific bin of the syntax elements cbf_cb and cbf_cr may be determined using a table (for example, "Table 9-24") indicated by the context index table index (ctxIdxTable).

Table 23 schematically shows an example of a context table in which the context indices are allocated when the offsets and the context indices of syntax elements cbf_cb and cbf_cr are indicated using individual tables.

TABLE 23

| syntax | bin index (binIdx) | | | | | |
|---|---|---|---|---|---|---|
| element | 0 | 1 | 2 | 3 | 4 | >=5 |
| cbf_cb, cbf_cr | trafoDepth | na | na | na | na | na |

In the example of Table 23, the context indices may be indicated by bin indices (binIdx).

As described above, the context index may differ depending on the environment (state or condition) in which the syntax element is applied. For example, as for the same bin (or bin index), different contexts may be applied to the bins at the same position in the codeword (or binary code) depending on the state or condition such as the depth or the size of a block in which the syntax element is applied.

In the example of Table 23, a context index may be determined for bin index 0 of cbf_cb and cbf_cr on the basis of the partition depth (for example, trafoDepth) of the current transform unit.

Referring to Table 23, the depth value (trafoDepth) of the a transform unit (TU) to which the syntax element will be applied may be applied or utilized as a context index to bin index 0 of the syntax elements cbf_cb and cbf_cr. No context index may be allocated to the bin indices having a value of 1 or greater or NA (not available) may be allocated thereto.

Table 23 shows an example where the context index values by bins are specifically set. The context index values by bins in Table 23 may be set to be different from the values shown in Table 23.

Table 24 shows still another example of a context table that can be applied to syntax elements "cbf_cb and cbf_cr". In the context table according to the example of Table 24, the offsets and/or the context indices may be set. The contexts to be applied to the bins constituting the codeword (or binary code) of the syntax elements "cbf_cb and cbf_cr" may be indicated by the sum of the offsets and the context indices.

TABLE 24

| slice type | offset | context index by bin 0 |
|---|---|---|
| I | 0 | X |
| P | 1 | X |
| B | 2 | X |

In the example of Table 24, different offset values may be set depending on the slice type. For example, the context index offset values of cbf_cb and cbf_cr may be set to 0 in the I slice, the context index offset values of cbf_cb and cbf_cr may be set to 1 in the P slice, and the context index offset values of cbf_cb and cbf_cr may be set to 2 in the B slice. Accordingly, in the example of Table 24, different contexts may be allocated by conditions by applying different offsets depending on the state information or the condition.

However, this is only an example, and the offset values in Table 24 may be set to be different from the values shown in Table 24 so as to indicate suitable contexts, and may have different values depending on the slice type. For example, the context index offset values of cbf_cb and cbf_cr may be set to 0 in the I slice, the context index offset values of cbf_cb and cbf_cr may be set to 2 in the P slice, and the context index offset values of cbf_cb and cbf_cr may be set to 1 in the B slice. Alternatively, a common offset value may be applied to all the slice types.

In the example of Table 24, a predetermined fixed context may be applied to bin index 0 indicating the first bin constituting the codeword (or binary code) of the syntax elements cbf_cb and cbf_cr. Here, a predetermined fixed context index (X) may be applied to bin index 0. Here, X may be a fixed value such as 0 or 1.

Table 24 shows an example where the context index values by bins are specifically set. The context index values by bins in Table 24 may be set to be different from the values shown in Table 24 so as to indicate suitable contexts.

Table 25 shows still another example of a context table that can be applied to syntax elements "cbf_cb and cbf_cr". In the context table according to the example of Table 20, the offsets, the context indices, and the information on whether to apply the bypass mode may be set.

TABLE 25

| slice type | offset | context index by bin 0 |
|---|---|---|
| I | 0 | bypass |
| P | 1 | bypass |
| B | 2 | bypass |

In the example of Table 25, different offset values may be set depending on the slice type. For example, the context index offset values of cbf_cb and cbf_cr may be set to 0 in the I slice, the context index offset values of cbf_cb and cbf_cr may be set to 1 in the P slice, and the context index offset values of cbf_cb and cbf_cr may be set to 2 in the B slice. Accordingly, in the example of Table 25, different contexts may be allocated by conditions by applying different offsets depending on the state information or the condition.

However, this is only an example, and the offset values in Table 25 may be set to be different from the values shown in Table 25 so as to indicate suitable contexts, and may have different values depending on the slice type. For example, the context index offset values of cbf_cb and cbf_cr may be set to 0 in the I slice, the context index offset values of cbf_cb and cbf_cr may be set to 2 in the P slice, and the context index offset values of cbf_cb and cbf_cr may be set to 1 in the B slice. Alternatively, a common offset value may be applied to all the slice types.

In the example of Table 25, instead of the context, the bypass coding may be applied to bin index 0 indicating the first bin constituting the codeword (or binary code) of the syntax elements cbf_cb and cbf_cr. Here, a predetermined fixed context index (X) may be applied to bin index 0. Here, X may be a fixed value such as 0 or 1.

In the examples of Tables 21 to 25, the context index increment is referred to as a context index for the purpose of convenience of explanation, and the context indices allocated to the bin indices in the examples of Tables 21 to 25 may actually mean context index increments (ctxIdxInc). Accordingly, in the examples of Tables 21 to 25, the actual context indices of the bins constituting the codeword (or binary code) of the syntax elements cbf_cb and cbf_cr may be determined by the sum of the offset (ctxIdxOffset) determined depending on the slice type and the context indices allocated to the bin indices.

On the other hand, in the above-mentioned embodiments, offset values different depending on the slice types may be applied or an offset value common to all the slice types may be applied. When the offset values different depending on the slice types are applied to a specific syntax element, different contexts may be applied to the same bin index depending on whether the slice is an I slice, a P slice, or a B slice. When the offset value common to all the slice types is applied, a context (or a context set) common to all the slice types may be applied.

However, the above-mentioned embodiments are only exemplary and the invention is not limited to the embodiments. The offset values may be set in a way other than in the above-mentioned embodiments.

For example, different contexts (or different context sets) may be applied to the same bin in a specific syntax element depending on whether a current slice is an intra slice or an inter slice. Here, the intra slice may mean an I slice, and the inter slice may include a P slice and a B slice. That is, the intra slice and the inter slice may be distinguished, different offset values may be applied to the intra slice and the inter slice, and a common offset value may be applied to the P slice and the B slice which are included in the inter slice.

While the methods in the above-mentioned embodiments have been described on the basis of the flowcharts as a series of steps or blocks, the invention is not limited to the order of the steps and a certain step may be performed in an order other than described above or at the same time as described above. The above-mentioned embodiments include various examples. Therefore, the invention includes all substitutions, corrections, and modifications belonging to the appended claims.

When it is mentioned above that an element is "connected to" or "coupled to" another element, it should be understood that still another element may be interposed therebetween, as well as that the element may be connected or coupled directly to another element. On the contrary, when it is mentioned that an element is "connected directly to" or "coupled directly to" another element, it should be understood that still another element is not interposed therebetween.

The invention claimed is:

1. An entropy decoding method, by a video decoding apparatus, comprising:

receiving a bitstream including split flag information for a current coding block and prediction information for the current coding block;

deriving a current luma transform block from the current coding block based on the split flag information;

deriving context information on a bin constituting a codeword of a syntax element cbf_luma that specifies whether a luma residual other than 0 is present in the current luma transform block;

performing an arithmetic decoding on the bin based on the derived context information;

deriving a value of the syntax element cbf_luma based on the decoded bin; and generating a reconstructed block for the current coding block based on the prediction information and the derived value of the syntax element cbf_luma, wherein the step of deriving the context information includes deriving the context information based on information on a transform depth (trafoDepth) of the current luma transform block, wherein a luma residual other than 0 is not present in the current luma transform block when the derived value of the syntax element cbf_luma is 0, and wherein at least one luma residual other than 0 is present in the current luma transform block when the derived value of the syntax element cbf_luma is 1.

2. The entropy decoding method according to claim 1, wherein the context information in the step of deriving the context information on the bin is indicated by the sum of a context index offset and a context value for the bin, and wherein the context index offset is determined depending on whether a current slice is an I slice, a P slice, or a B slice.

3. The entropy decoding method according to claim 2, wherein the value of the context index offset is 0 when the current slice is an I slice, is 2 when the current slice is a P slice, and is 4 when the current slice is a B slice.

4. The entropy decoding method according to claim 2, wherein in the step of deriving the context information on the bin, the bin is a first bin of the codeword to which a bin index having a value of 0 is allocated, and a value of 1 is allocated to the context value for the bin when the transform depth of the current luma transform block is 0.

5. The entropy decoding method according to claim 2, wherein in the step of deriving the context information on the bin, the bin is a first bin of the codeword to which a bin index having a value of 0 is allocated, and a value of 0 is allocated to the context value for the bin when the transform depth of the current luma transform block is not 0.

6. The entropy decoding method according to claim 2, wherein in the step of deriving the context information on the bin, the bin is a first bin of the codeword to which a bin index having a value of 0 is allocated, a context value of 1 is allocated to the bin when the transform depth of the current luma transform block is not 0 and the size of the transform block is equal to a maximum transform size of a current sequence, and a context index of 0 is allocated to the bin when the size of the current luma transform block is not equal to the maximum transform size.

7. The entropy decoding method according to claim 1, wherein the context information is specified by the sum of a context index offset determined based on a slice type of a current slice and a context value by the bin, wherein the value of a bin index indicating the bin in the syntax element cbf_luma is 0, and wherein the value of the context index offset is 0 when the current slice is an I slice, is 2 when the current slice is a P slice, and is 4 when the current slice is a B slice.

8. The entropy decoding method according to claim 7, wherein in the step of deriving the context information on the bin, the bin is a first bin of the codeword to which a bin index having a value of 0 is allocated, a value of 1 is allocated to the context value for the bin when the transform depth of the current luma transform block is 0, and a value of 0 is allocated to the context value for the bin when the transform depth of the current luma transform block is not 0.

9. The entropy decoding method according to claim 7, wherein in the step of deriving the context information on the bin, the bin is a first bin of the codeword to which a bin index having a value of 0 is allocated, a value of 1 is allocated to the context value for the bin when t the transform depth of the current luma transform block is 0, and a value of 1 is allocated to the context value for the bin when the transform depth of the current luma transform block is not 0 and the size of the current luma transform block is equal to a maximum transform size of a current sequence, and a value of 0 is allocated to the context value for the bin when the size of the current luma transform block is not equal to the maximum transform size.

10. The entropy decoding method according to claim 1, wherein the current luma transform block contains one or more transform coefficient levels not equal to 0 when the at least one luma residual other than 0 is present in the current luma transform block.

11. An entropy encoding method, by a video encoding apparatus, comprising:

deriving prediction information for a current coding block;

deriving a current luma transform block from the current coding block;

deriving a split flag information that specifies whether the current coding block is split;

determining a value of a syntax element cbf_luma that specifies whether a luma residual other than 0 is present in the current luma transform block;

deriving a bin constituting a codeword of the syntax element cbf_luma based on the value of the syntax element cbf_luma;

deriving context information on the bin constituting the codeword of the syntax element cbf_luma;

performing an arithmetic encoding on the bin based on the derived context information; and transmitting a bitstream including the encoded bin, the split flag information and the prediction information, wherein the deriving the context information includes deriving the context information based on information on a transform depth (trafoDepth) of the current luma transform block, wherein a luma residual other than 0 is not present in the current luma transform block when the derived value of the syntax element cbf_luma is 0, and wherein at least one luma residual other than 0 is present in the current luma transform block when the derived value of the syntax element cbf_luma is 1.

12. The entropy encoding method according to claim 11, wherein the context information is indicated by the sum of a context index offset and a context value for the bin, and wherein the context index offset is determined depending on whether a current slice is an I slice, a P slice, or a B slice.

13. The entropy encoding method according to claim 12, wherein the value of the context index offset is 0 when the current slice is an I slice, is 2 when the current slice is a P slice, and is 4 when the current slice is a B slice.

14. The entropy encoding method according to claim 12, wherein the bin is a first bin of the codeword to which a bin index having a value of 0 is allocated, and wherein a value of 1 is allocated to the context value for the bin when the transform depth of the current luma transform block is 0.

15. The entropy encoding method according to claim 12, wherein the bin is a first bin of the codeword to which a bin index having a value of 0 is allocated, and wherein a value of 0 is allocated to the context value for the bin when the transform depth of the current luma transform block is not 0.

16. The entropy encoding method according to claim 12, wherein the bin is a first bin of the codeword to which a bin index having a value of 0 is allocated, wherein a context value of 1 is allocated to the bin when the transform depth of the current luma transform block is not 0 and the size of the transform block is equal to a maximum transform size of a current sequence, and wherein a context index of 0 is allocated to the bin when the size of the current luma transform block is not equal to the maximum transform size.

17. The entropy encoding method according to claim 11, wherein the context information is specified by the sum of a context index offset determined based on a slice type of a current slice and a context value by the bin, wherein the value of a bin index indicating the bin in the syntax element cbf_luma is 0, and wherein the value of the context index offset is 0 when the current slice is an I slice, is 2 when the current slice is a P slice, and is 4 when the current slice is a B slice.

18. The entropy encoding method according to claim 17, wherein the bin is a first bin of the codeword to which a bin index having a value of 0 is allocated, wherein a value of 1 is allocated to the context value for the bin when the transform depth of the current luma transform block is 0, and wherein a value of 0 is allocated to the context value for the bin when the transform depth of the current luma transform block is not 0.

19. The entropy encoding method according to claim 11, wherein the current luma transform block contains one or more transform coefficient levels not equal to 0 when the at least one luma residual other than 0 is present in the current luma transform block.

20. A non-transitory computer readable storage medium storing information on instructions, when executed, causing a video decoding apparatus to perform operations comprising:

receiving a bitstream including split flag information for a current coding block and prediction information for the current coding block;

deriving a current luma transform block from the current coding block based on the split flag information;

deriving context information on a bin constituting a codeword of a syntax element cbf_luma that specifies whether a luma residual other than 0 is present in the current luma transform block;

performing an arithmetic decoding on the bin based on the derived context information;

deriving a value of the syntax element cbf_luma based on the decoded bin; and generating a reconstructed block for the current coding block based on the prediction information and the derived value of the syntax element cbf_luma, wherein the step of deriving the context information includes deriving the context information based on information on a transform depth (trafoDepth) of the current luma transform block, wherein a luma residual other than 0 is not present in the current luma transform block when the derived value of the syntax element cbf_luma is 0, and wherein at least one luma residual other than 0 is present in the current luma transform block when the derived value of the syntax element cbf_luma is 1.

* * * * *